US008880687B1

(12) United States Patent
Chandrachari et al.

(10) Patent No.: US 8,880,687 B1
(45) Date of Patent: Nov. 4, 2014

(54) DETECTING AND MANAGING IDLE VIRTUAL STORAGE SERVERS

(75) Inventors: Aravinda Chandrachari, Karnataka (IN); Ashwin Pankaj, Karnataka (IN); Sri Mahesh Ponugoti, Karnataka (IN); Sree Pardhasaradhi Gunnam, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 158 days.

(21) Appl. No.: 13/366,961

(22) Filed: Feb. 6, 2012

(51) Int. Cl.
  *G06F 15/173* (2006.01)
(52) U.S. Cl.
  USPC .......................................................... 709/224
(58) Field of Classification Search
  USPC .......................................................... 709/224
  See application file for complete search history.

(56) References Cited

U.S. PATENT DOCUMENTS

| 2009/0248870 A1* | 10/2009 | Kamei et al. | 709/225 |
| 2011/0099268 A1* | 4/2011 | Ozaki et al. | 709/224 |
| 2012/0066677 A1* | 3/2012 | Tang | 718/1 |

OTHER PUBLICATIONS

U.S. Appl. No. 12/215,487, filed Jun. 24, 2008, Caradonna.

* cited by examiner

*Primary Examiner* — Vivek Srivastava
*Assistant Examiner* — Sibte Bukhari
(74) *Attorney, Agent, or Firm* — Kacvinsky Daisak Bluni, PLLC

(57) ABSTRACT

Detecting and managing idle virtual storage servers (VSSs) on a host system. The host system may execute several VSSs, each VSS may comprise a virtual machine implementing a virtualized storage operating system and provide storage services for one or more clients. Detecting and managing idle virtual storage servers comprises three stages: 1) detecting idle VSSs, 2) suspending an idle VSS, and 3) un-suspending a suspended VSS. For the first stage, idle VSSs are detected using a first metric relating to network activity of the VSS, a second metric relating to storage object-related requests received by a VSS, and a third metric relating to inbound data for a VSS. For the second stage, an idle virtual storage server is suspended to release its resources while preserving its state for possible later use. For the third stage, a suspended virtual storage server may be unsuspended if a client attempts to access it.

16 Claims, 15 Drawing Sheets

DETECTING AND MANAGING IDLE VIRTUAL STORAGE SERVERS

FIELD OF THE INVENTION

The present invention relates generally to storage systems, and more specifically to detecting and managing idle virtual storage servers.

BACKGROUND OF THE INVENTION

As computer networks have become faster and more reliable, the deployment of network storage servers in enterprise computing environments has become more widespread. In a typical enterprise computing environment, client systems such as computer workstations, database servers, web servers, and other application servers can access data stored remotely from the client systems, typically in one or more central locations. One or more computer networks, e.g., one or more local area networks (LANs) or wide area networks (WANs), connect the client systems to mass storage devices, such as disks, disposed at the central locations. Such centralized network data storage at storage servers facilitates the sharing of data among many geographically distributed client systems. Network data storage also enables information systems (IS) departments to use highly reliable (sometimes redundant) computer equipment to store their data.

In the typical storage system environment, specialized computers such as file servers, storage servers, storage appliances, etc. (referred to hereinafter as storage servers) located at the central locations make the data stored on the storage devices (e.g., disks) available to the client systems. For example, a storage server can have a monolithic architecture, in which network and data components are contained within a single device. Software miming on the storage servers and other software running on the client systems communicate according to well-known protocols, such as the Network File System (NFS) protocol, the Common Internet File System (CIFS) protocol, and the Direct Access File System (DAFS) protocol, to make the data stored on the storage devices appear to users and application programs as though the data were stored locally on the client systems. Each storage server makes data available to the client systems by presenting or exporting one or more storage objects (e.g., volumes) to the client systems. Each volume is configured to store data files, scripts, word processing documents, executable programs, and the like. From the perspective of a client system, each volume can appear to be a single storage device drive. However, each volume can represent the storage space in a single storage device, a redundant array of independent disks (RAID) or a RAID set, an aggregate of some or all of the storage space in a set of storage devices, or any other suitable set of storage space.

In addition, multiple storage servers can be arranged in a cluster configuration to form a single "cluster storage server system." The cluster storage server system has a distributed architecture that includes a plurality of storage servers (referred to as "nodes") interconnected by a switching fabric. Each storage server node typically includes a network module (an N-module), a disk module (a D-module), and a management module (an M-host). The N-module provides functionality that enables a respective node within the clustered system to connect to a client system over a computer network, the D-module provides functionality enabling the respective node to connect to one or more storage devices, and the M-host provides management functions for the clustered system. A switched virtualization layer is provided below the interface between the N-modules and the client systems, allowing the storage devices associated with the multiple nodes in the cluster configuration to be presented to the client systems as a single shared storage pool.

In a typical mode of operation, a client system transmits an NFS, CIFS, or DAFS access request for data to one of the storage server nodes within the clustered system. The access request typically includes a file handle for a data file stored in a specified volume. The N-module within the node that received the request extracts a volume identifier from the file handle, and uses the volume identifier to index a volume location database (VLDB) to obtain an identification of an aggregate storing the specified volume. The N-module then uses the aggregate identification to locate the D-module responsible for the aggregate, and transmits a request to the D-module for the data on the specified volume using an internal protocol. The D-module executes the request, and transmits, using the internal protocol, a response containing the requested volume data back to the N-module, which in turn transmits an NFS, CIFS, or DAFS response with the requested data to the client system. In this way, the N-modules can export, to the client systems, one or more volumes that are stored on aggregates accessible via the D-modules.

As described above, a storage server environment may comprise one or more storage servers connected with a plurality of client systems, the storage servers storing data on a plurality of storage devices for client systems. Each storage server executes a storage operating system for receiving data access requests (such as read or write requests) from the client systems and performing the access requests on the storage devices.

In a virtual storage server environment, a client system may be used as a host system that executes a host operating system and a plurality of virtual machines (VMs). Each virtual machine may comprise a guest operating system that is a virtualized storage operating system. The virtualized storage operating system may provide a simulated storage server to client systems for accessing data on the storage devices, the simulated storage server appearing as an actual storage server to the client systems. As such, a virtual machine that implements a virtualized storage operating system may be referred to as a "virtual storage server."

The host system may comprise a pool of hardware and/or software resources that are shared by the plurality of virtual machines, each virtual machine being allocated a set of resources for exclusive use by the virtual machine. For example, each virtual machine may be allocated a particular number of processors and a particular amount of storage space in a local memory and/or a local storage device for use by the virtual machine. As such, the maximum number of virtual machines that can be hosted on the host system is limited by the amount of hardware and/or software resources of the host system.

A problem occurs, however, if a virtual machine is allocated resources of the host system but the virtual machine is not in use (is idle). In this situation, valuable resources of the host system are being wasted by the unused/idle virtual machine and there may not be enough resources to provision new virtual machines on the host system. Conventional methods of detecting idle virtual machines may include monitoring processor usage and storage device input/output (I/O) operations. However, the virtualized storage operating system may implement a "heartbeat" feature that periodically executes a message signal procedure that requires processor usage and I/O operations. The heartbeat feature is used by some storage operating systems in high availability systems to periodically register heartbeat signals to indicate that the storage server is still functional and online In some cases, a virtual machine implementing a virtualized storage operating system may be idle except for the periodic execution of the heartbeat feature. In these cases, the virtual machine should still be considered idle as the virtual machine is otherwise not in use. However, conventional methods would not detect the virtual machine as idle since the virtual machine will still periodically require processor usage and I/O operations. As such, there is a need for a better way to detect idle virtual machines that implement a virtualized storage operating system (virtual storage server).

SUMMARY OF THE INVENTION

Described herein are systems and methods for detecting and managing idle virtual storage servers on a host system. The host system may execute a plurality of virtual machines, each virtual machine implementing a virtualized storage operating system comprising a virtual storage server. Through one or more networks, the host system may be connected with one or more client systems and one or more storage servers that store data on storage devices for the client systems. A client system may establish a network connection with a particular virtual storage server of the host system, whereby the virtual storage server may provide data storage services to the client systems for accessing the data on the storage devices. Detecting and managing idle virtual storage servers on a host system may be divided in three stages: 1) detecting/identifying idle virtual storage servers, 2) suspending a virtual storage server identified as idle, and 3) resuming/un-suspending a suspended virtual storage server.

For the first stage, detecting an idle/unused virtual storage server using metrics about processor consumption and I/O operations may not be useful in distinguishing between used and idle virtual storage servers due to the heartbeat feature. The embodiments herein propose a more comprehensive method to identify idle virtual storage servers by considering other metrics related to ways that a virtual storage server may actually be used, e.g., by client systems or administrators.

In some embodiments, a first metric that may be considered comprises the occurrence of network activity through network connections of the virtual storage server within a predetermined time period. For each virtual storage server, the host system may allocate one or more virtual interfaces for establishing one or more network connections with one or more client systems. The virtual interfaces may serve as network ports (e.g., management or data ports) of the virtual storage server, each network port having an associated IP address. Network activity/traffic on the virtual interfaces may be examined to determine the network activity of the virtual storage server. In some embodiments, if the virtual storage server shows no network activity for a predetermined period of time, the first metric for the virtual storage server may be determined to be true. In some embodiments, if it is determined that no network connections (e.g., Telnet or Secure Shell (SSH) connections) have been established on any of the virtual interfaces of the virtual storage server for a predetermined period of time, the first metric for the virtual storage server may be determined to be true. In some embodiments, if it is determined that no network connections have been established on any of the IP addresses of the virtual storage server for a predetermined period of time, the first metric for the virtual storage server may be determined to be true.

In further embodiments, a second metric that may be considered comprises the occurrence of network activity of a virtual storage server related to storage objects of the virtual storage server within a predetermined time period. In some embodiments, the network activity of a virtual storage server may be examined to determine, for example, whether any storage objects of the virtual storage server have been mounted or accessed within a predetermined time period. Each virtual storage server may be allocated one or more storage objects (e.g., volumes) on one or more storage devices for storing data of one or more client systems. Before a client system can use a storage object, however, the client system requests a mount procedure for the storage object by sending a mount request/command to the virtual storage server (e.g., using the Network File System (NFS), CIFS, or ISCSI protocols), the mount procedure making the storage object accessible to the client system. The client system may then send access requests (e.g., read or write requests) to the virtual storage server for the storage object. In some embodiments, if it is determined that the virtual storage server has not had any network activity related to storage objects of the virtual storage server, the second metric for the virtual storage server may be determined to be true. In some embodiments, if it is determined that the virtual storage server has not received any storage object-related requests (e.g., mount or access requests) from client systems for a predetermined period of time, the second metric for the virtual storage server may be determined to be true.

In additional embodiments, a third metric that may be considered comprises the occurrence of inbound data for the virtual storage server that is received from a console system within a predetermined time period. In a conventional storage server environment, a console system will typically be connected with each storage server to send "inbound data" to the storage server and receive "outbound data" from the storage server. For example, the console system may comprise input devices (e.g., keyboard and mouse) and output devices (e.g. monitor) that is used by an administrator/user to input data and/or commands (inbound data) to the storage server and receive responses (outbound data) from the storage server. In a virtual storage server environment, the console system may be connected with a client system that is connected with the virtual storage server. The data activity between the console/client system and the virtual storage server may be examined to determine whether the virtual storage server has received any inbound data from the console/client system. In some embodiments, if the virtual storage server has not received any such inbound data for a predetermined period of time, the third metric for the virtual storage server may be determined to be true.

In some embodiments, any of the first, second, or third metrics may be used alone to identify idle virtual storage servers. In other embodiments, any combination of the three metrics may be used to identify idle virtual storage servers. For example, a virtual storage server may be identified as idle based on all three metrics, or based on two of the metrics, or based on a single metric. For example, a virtual storage server may be identified as idle if two metrics are found to be true, or identified as idle if three metrics are found to be true.

For the second stage, each virtual storage server identified as idle, in the first stage, may be 'suspended' to free-up/release the resources allocated to the idle virtual storage server. These released resources are then available for allocation and use to a new virtual storage server on the host system. In some embodiments, an idle virtual storage server is suspended while still preserving the state of the idle virtual storage server for possible later use (in the third stage). In these embodiments, each host system is configured to execute a "placeholder" virtual machine that is allocated a total number of virtual interfaces/ports that allow for receiving and configuring the IP addresses of all the virtual storage servers on the host system. The total number of virtual interfaces may be determined, for example, by determining the maximum number of virtual storage servers that are able to execute simultaneously on the host system multiplied by the maximum number of virtual interfaces/ports that will be allocated to each virtual storage server. An idle virtual storage server may be suspended by communicating the IP addresses of the idle virtual storage server to the placeholder virtual machine. The IP addresses are then configured on the virtual interfaces of the placeholder virtual machine. The host system also stores a mapping data structure for mapping the idle virtual storage server and its previous IP addresses. The mapping data structure may store a unique identifier for each suspended and idle virtual storage server and a list of IP addresses formerly associated with each suspended and idle virtual storage server.

For the third stage, if a client system attempts to access a suspended virtual storage server, a process is performed to then un-suspend/resume the virtual storage server. For example, the client system may attempt to make a network connection with the suspended virtual storage server using an IP address formerly associated with the suspended virtual storage server (as determined using the mapping data structure). Or an administrator/user may attempt to access the virtual storage server using a console system that is connected with the client system. In these situations, the placeholder virtual machine may un-configure/remove all IP addresses of the suspended virtual storage server from its virtual interfaces, and delete the mapping records of the IP addresses in the mapping data structure. The placeholder virtual machine then re-configures the IP addresses back to the virtual interfaces of the suspended virtual storage server. Resources of the host system are then re-allocated to the virtual storage server if available, otherwise the virtual storage server may be migrated to another host system with sufficient resources and can be resumed on the other host system.

BRIEF DESCRIPTION OF THE DRAWINGS

The novel features are set forth in the appended claims. However, for purpose of explanation, several embodiments are set forth in the following figures.

DETAILED DESCRIPTION

Figure 1:
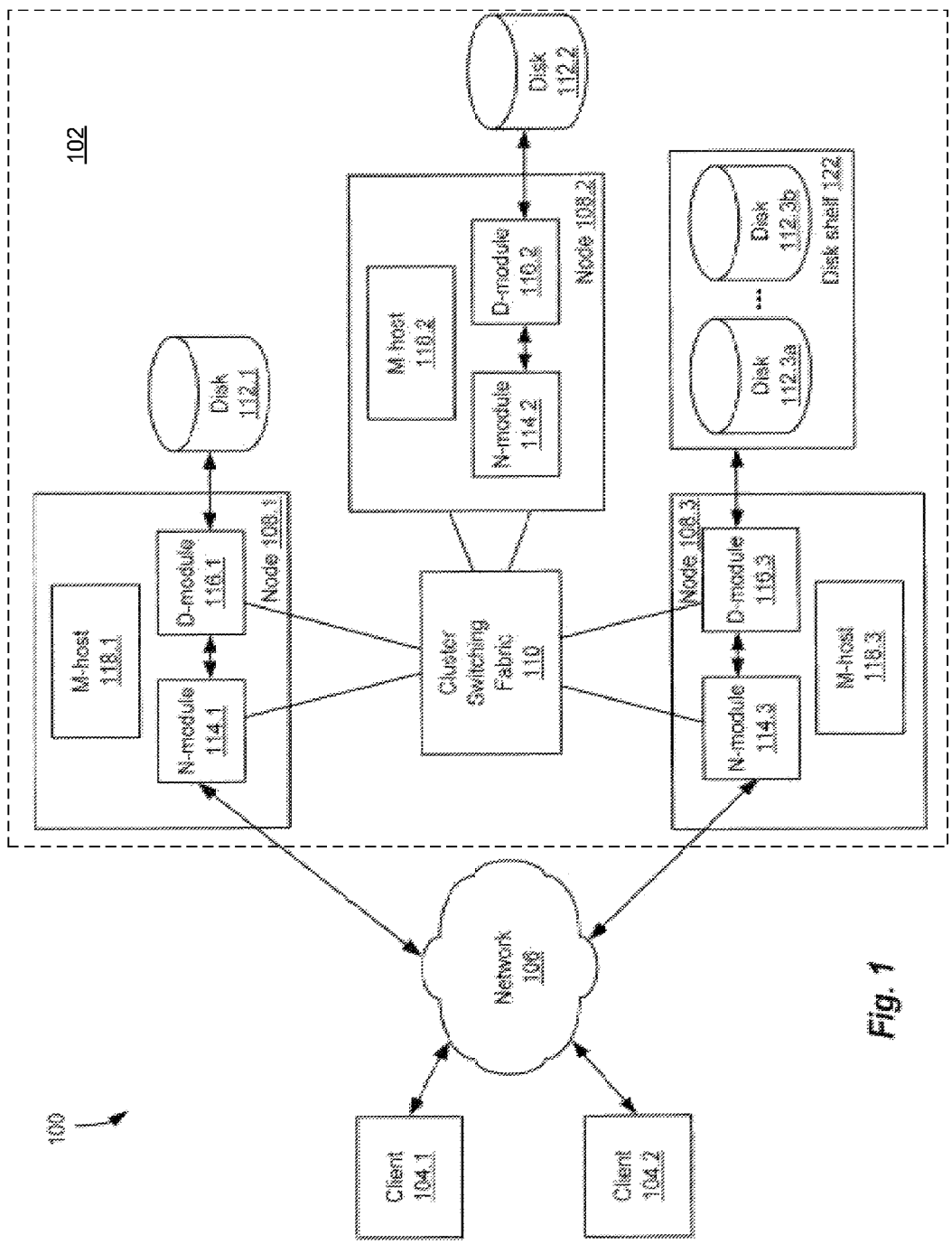
FIG. 1 is a block diagram of a cluster storage server system including a plurality of storage server nodes.

The description that follows is divided into five sections. Section I contains terms used herein. Section II describes a virtual storage server environment in which some embodiments operate. Section III describes a first stage comprising detecting an idle virtual storage server. Section IV describes a second stage comprising suspending an idle virtual storage server. Section V describes a third stage comprising un-suspending a suspended virtual storage server.

I. Terms

Console server module: As used herein, a console server module provides a virtual console for a virtual machine. The console server module receives "inbound" data for the virtual machine from a console system and sends "inbound" data from the virtual machine in response.

Storage object: As used herein, a storage object comprises any logically definable storage element hosted, stored, or contained within a cluster storage server system. Each storage object may be stored in one or more storage servers on one or more storage devices of the cluster storage server system. A non-exhaustive list of storage object examples include aggregates, volumes or virtual volumes (e.g., flexible volumes), logical units (LUs) in a q tree, q trees in a volume, etc. In other embodiments, storage objects comprise any other logically definable storage element stored or contained within the cluster storage server system.

Storage object-related request: As used herein, a storage object-related request is a request related to a storage object, such as a mount request or access requests (e.g., read or write requests).

Virtual machine (VM) manager: As used herein, a VM manager (e.g., VMware™ ESX, Microsoft™ Hyper-V, Citrix XenServer™, etc.) may comprise a module/engine that executes on a host system to produce and manage VMs of the host system. The VM manager module/engine may virtualize the hardware and/or software resources of the servers for use by the VMs.

Virtual storage component: As used herein, a virtual storage component is used by a VM for storing data. In some embodiments, a virtual storage component may reside on a host system and does not reside on a storage server. A virtual storage component on a host system may have an underlying and corresponding storage object stored on a storage server. For example, in a VMware™ environment, a virtual storage component may comprise a datastore or virtual machine disk (VMDK), and in a Hyper-V environment, a virtual storage component may comprise a virtual hard drive (VHD) or local drive.

Virtual storage server: As used herein, a virtual storage server may comprise a virtual machine that executes a virtualized storage operating system.

II. Virtual Storage Server Environment

This section discusses a virtual storage server environment comprising a plurality of client systems and at least one storage server for storing data of the client systems on a plurality of storage devices. In the environment, at least one client system is used as a host system that executes a host operating system and a plurality of virtual machines (VMs). Each virtual machine may comprise a guest operating system that is a virtualized storage operating system. The virtualized storage operating system may provide a simulated storage server to client systems for accessing data on the storage devices, the simulated storage server appearing as an actual storage server to the client systems. As such, a virtual machine that implements a virtualized storage operating system may be referred to below as a "virtual storage server."

A. Cluster Storage Server System

FIG. 1 depicts an illustrative embodiment of a cluster storage system environment 100, including a plurality of client systems 104.1-104.2, a cluster storage server system 102, and at least one computer network 106 communicably interconnecting the client systems 104.1-104.2 and the cluster storage server system 102. As shown in FIG. 1, the cluster storage server system 102 includes a plurality of storage server nodes 108.1-108.3, a cluster switching fabric 110, and a plurality of mass storage devices 112.1-112.2 (such as disks) and a storage device shelf (such as disks 112.3a-112.3b). Each of the plurality of nodes 108.1-108.3 is configured to include an N-module, a D-module, and an M-host, each of which can be implemented as a separate software module or engine. Specifically, the node 108.1 includes an N-module 114.1, a D-module 116.1, and an M-host 118.1, the node 108.2 includes an N-module 114.2, a D-module 116.2, and an M-host 118.2, and the node 108.3 includes an N-module 114.3, a D-module 116.3, and an M-host 118.3. The N-modules 114.1-114.3 include functionality that enables the respective nodes 108.1-108.3 to connect to one or more of the client systems 104.1-104.2 over the computer network 106, while the D-modules 116.1-116.3 connect to one or more of the disks 112.1-112.2 and the disk shelf 122. The M-hosts 118.1-118.3 provide management functions for the cluster storage server system 102.

A switched virtualization layer including a plurality of virtual interfaces (VIFs) is provided below the interface between the respective N-modules 114.1-114.3 and the client systems 104.1-104.2, allowing the disks 112.1-112.2, 112.3a-112.3b associated with the respective nodes 108.1-108.3 to be presented to the client systems 104.1-104.2 as a single shared storage pool. The nodes 108.1-108.3 are interconnected by the switching fabric 110, which, for example, may be embodied as a Gigabit Ethernet switch. Although FIG. 1 depicts an equal number (i.e., 3) of N-modules 114.1-114.3, D-modules 116.1-116.3, and M-Hosts 118.1-118.3, any other suitable number of N-modules, D-modules, and M-Hosts may be provided. There may also be different numbers of N-modules, D-modules, and/or M-Hosts within the cluster storage server system 102. For example, in alternative embodiments, the cluster storage server system 102 may include a plurality of N-modules and a plurality of D-modules interconnected in a configuration that does not reflect a one-to-one correspondence between the N-modules and D-modules. Each storage server node of the cluster storage server system 102 can include a storage operating system, such as the NetApp®Data ONTAP™ 11 storage operating system, available from NetApp, Inc., Sunnyvale, Calif., USA, that implements the WAFL™ file system, or any other suitable storage operating system.

The client systems 104.1-104.2 of FIG. 1 may be implemented as general-purpose computers configured to interact with the respective nodes 108.1-108.3 in accordance with a client/server model of information delivery. In the presently disclosed embodiment, the interaction between the client systems 104.1-104.2 and the nodes 108.1-108.3 enable the provision of network data storage services. Specifically, each client system 104.1, 104.2 can request the services of the respective node 108.1, 108.2, 108.3, and that node can return the results of the services requested by the respective client system by exchanging packets over the computer network 106, which may be wire-based, optical fiber, wireless, or any other suitable combination thereof. The client systems 104.1-104.2 can issue packets according to file-based access protocols such as the Network File System (NFS) protocol, the Common Internet File System (CIFS) protocol, and the Direct Access File System (DAFS) protocol over the Transmission Control Protocol/Internet Protocol (TCP/IP), when accessing information in the form of files and directories. In an alternative embodiment, the client systems 104.1-104.2 can issue packets including block-based access protocols, such as the Small Computer Systems Interface (SCSI) protocol encapsulated over TCP (iSCSI) or the Fibre Channel Protocol (FCP), when accessing information in the form of blocks. It is noted that the storage system environment 100 supports file-based and/or block-based access requests.

In a typical mode of operation, one of the client systems 104.1-104.2 transmits an NFS, CIFS, or DAFS request for data to one of the nodes 108.1-108.3 within the cluster storage server system 102. The client request typically includes a file handle for a data file stored in a specified volume on one or more of the disks 112.1-112.2, 112.3a-112.3b. The N-module included in that node processes the client request, translating the request into a Remote Procedure Call (RPC) using an internal protocol, such as the SpinNP protocol available from NetApp, Inc. Next, the N-module transmits the SpinNP RPC over the cluster switching fabric 110 to the node that includes the D-module associated with the target volume. Upon receipt of the SpinNP RPC, the D-module of the node responsible for the target volume processes the RPC. The D-module then transmits an internal SpinNP response containing the requested data to the N-module, which, in turn, transmits an NFS, CIFS, or DAFS response containing the requested data to the client system.

Figure 2:
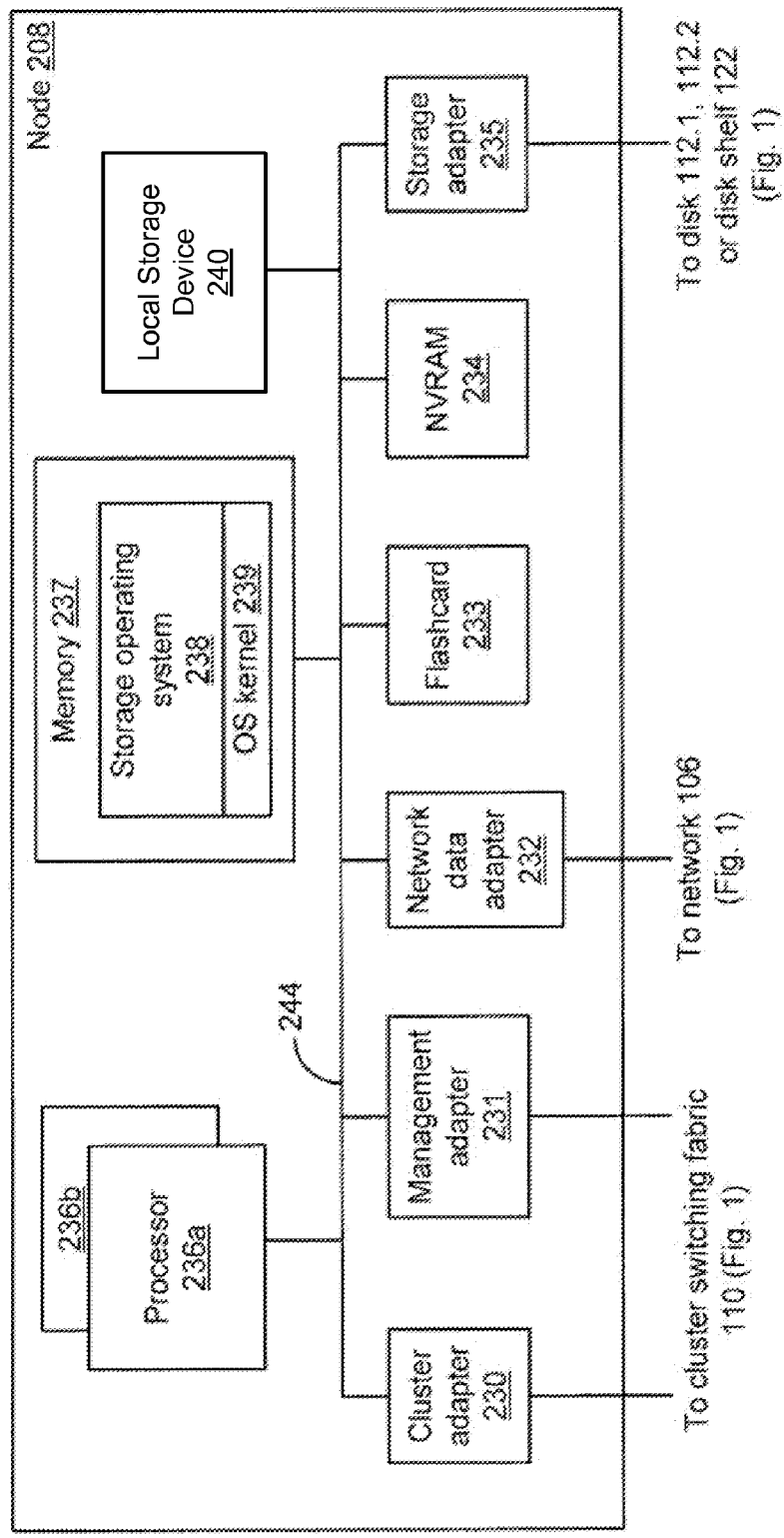
FIG. 2 is a block diagram illustrating a node of the cluster storage server system of FIG. 1.

FIG. 2 depicts an illustrative embodiment 208 of one of the storage server nodes 108.1-108.3 included in the storage system environment 100 (see FIG. 1). As shown in FIG. 2, a storage server node 208 is embodied as a storage system including a plurality of processors 236a, 236b, at least one memory device 237, a local storage device 240 (e.g., disk), a flashcard 233, a non-volatile RAM (NVRAM) 234, and a plurality of network adapters interconnected by a system bus 244. The plurality of network adapters includes a network adapter 230 for cluster traffic (referred to hereinafter as a cluster adapter), a network adapter 231 for management traffic (referred to hereinafter as a management adapter), a network adapter 232 for data traffic (referred to hereinafter as a network data adapter), and a network adapter 235 for storage traffic (referred to hereinafter as a storage adapter). The cluster adapter 230 and the management adapter 231 each include a plurality of ports adapted to couple the node 208 to other ones of the nodes within the cluster storage server system 102. In the illustrated embodiment, Ethernet is used as the clustering protocol and interconnect media, although any other suitable types of protocols and interconnects may be employed. In alternative embodiments in which the N-modules and the D-modules are implemented on separate storage systems or computers, the cluster adapter 230 is utilized by the N-modules or the D-modules for communicating with other network or disk modules within the storage system environment 100.

As shown in FIG. 2, the node 208 is illustratively embodied as a dual processor storage system executing a storage operating system 238, which implements a high-level module such as a file system for logically organizing stored information as a hierarchical structure of named directories, files, and blocks on the disks 112.1-112.2, 112.3a-112.3b. In the illustrated embodiment, the dual processor storage system also executes an operating system (OS) kernel 239 such as the FreeBSD operating system kernel that manages the interaction between hardware components and higher-level software applications running on the node 208. It will be apparent to those of ordinary skill in the art that the node 208 may alternatively comprise a single processor system, or a processor system with more than two processors. In the illustrated embodiment, the processor 236a executes the functions of an N-module, while the processor 236b executes the functions of a D-module.

The memory 237 illustratively comprises storage locations that are addressable by the processors 236a, 236b and the various adapters 230, 231, 232, 235 for storing software program code and data structures. The storage operating system 238, portions of which are typically resident in the memory 237 and executed by the processors 236a-236b, functionally organizes the node 208 by invoking storage operations in support of the storage service implemented by the node 208. It will be apparent to those skilled in the art that other processing and memory means, including various computer readable media, may be employed for storing and executing program instructions.

The network data adapter 232 comprises a plurality of ports adapted to couple the node 208 to one or more of the client systems 104.1-104.2 over point-to-point links, wide area networks (WANs), virtual private networks (VPNs) implemented over a public network (e.g., the Internet), or a shared local area network (LAN). The network data adapter 232 may therefore comprise mechanical, electrical, optical, or other connection and signaling components to connect the node 208 to a network. For example, the computer network 106 may be embodied as an Ethernet network, a Fiber Channel (FC) network, or any other suitable network. Each of the client systems 104.1-104.2 can communicate with the node 208 over the network 106 by exchanging discrete frames or packets of data according to pre-defined protocols, such as TCP/IP.

The storage adapter 235 cooperates with the storage operating system 238 executing on the node 208 to access information requested by the client systems 104.1-104.2. The information may be stored on any type of attached array of writable storage device media such as video tape, optical, DVD, magnetic tape, bubble memory, electronic random access memory, micro-electro mechanical, and any other suitable media adapted to store information. In the illustrated embodiment, such information can be stored on the disks 112.1-112.2 and/or on the disks 112.3a-112.3b of the disk shelf 122. The storage adapter 235 comprises a plurality of ports having input/output (I/O) interface circuitry that couples to the disks over an I/O interconnect arrangement such as a high-performance FC link topology.

The NVRAM 234 is a battery-backed non-volatile memory that is included in the node 208 to improve overall system performance. For example, responsive to a data write request of one of the client systems 104.1-104.2, data written by the respective client system can initially be stored in the NVRAM 234 before the node 208 acknowledges the completion of the data write request. The data can then be transferred to one of the disks 112.1-112.2 or to the disk shelf 122. Within the cluster storage server system 102, each of the nodes 108.1-108.3 can maintain a copy of the data stored in the NVRAM of the other nodes to assure that each node in the clustered system 102 can takeover the operations and workload of another node in the event of a node failure. After taking over from a node that failed, a node can handle file service requests that are normally routed to it from the client systems 104.1-104.2 in addition to file service requests that had been previously handled by the failed node.

The flashcard 233 is included in the node 208 to facilitate the shipping of software program code updates and/or the downloading of stored data to a local or remote computer for further processing and analysis. For example, the flashcard 233 may be implemented as a removable mini flashcard device.

In some embodiments, the nodes in the cluster may continually monitor each other to detect a failure of any node, e.g., by notifying one another of continued operation using a heartbeat signal passed between the nodes. For each node, the "heartbeat" feature periodically executes a message signal procedure that may require use of a processor 236 and/or input/output (I/O) operations of the local storage device 240. The heartbeat feature is used by some storage operating systems in high availability systems to periodically register heartbeat signals to indicate that the storage server node is still functional and online. In the absence of a heartbeat signal from a node (for a longer time period than a predetermined time interval, whereby a heartbeat signal "time out" has occurred), another node may assume the node has failed (is in a failed state). If a node detects the absence of a heartbeat signal from another node, a failure is detected and a takeover procedure of the other node may be initiated. A failure of a node may be caused by a variety of reasons, such as a software failure (e.g., failure of the N-module or D-module), hardware failure, or may occur intentionally (e.g., where a node is taken offline for servicing by an administrator). Upon determining a node failure, takeover of ownership of the aggregates of a "failed" node may be initiated by the one or more other nodes in the cluster.

B. Storage Operating System

Figure 3:
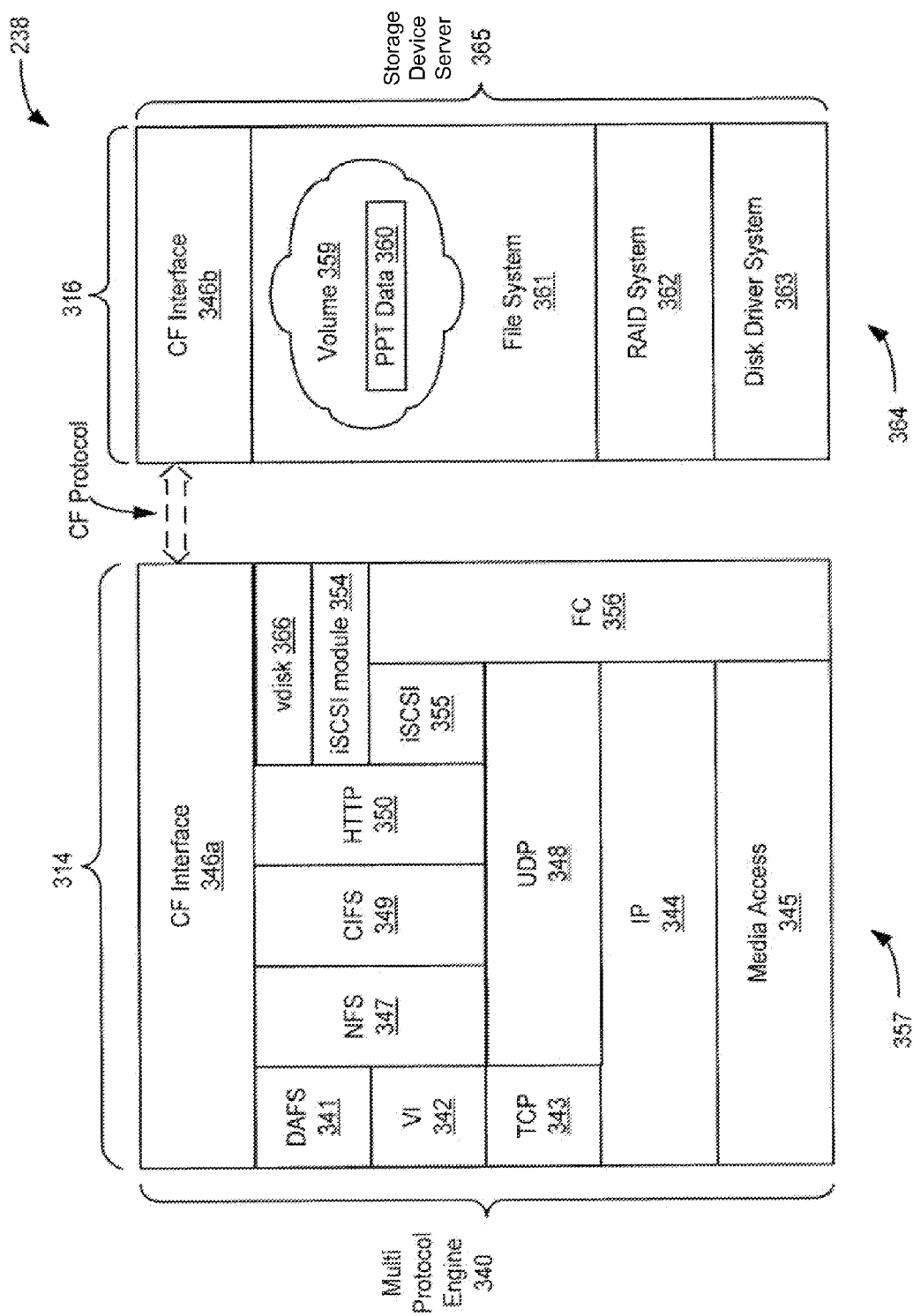
FIG. 3 is a block diagram illustrating a storage operating system that is executable on the cluster storage server system of FIG. 1.

FIG. 3 shows a conceptual diagram of an exemplary storage operating system 238 of a storage server node 208. As shown in FIG. 3, the storage operating system 238 comprises a series of software layers organized to form an integrated network protocol stack or, more generally, a multi-protocol engine 340 that provides data paths for the client systems 104.1-104.2 to access information stored on the respective nodes 108.1-108.3 using block and file access protocols. The multi-protocol engine 340 includes a media access layer 345 of network drivers, for example, gigabit Ethernet drivers, that interfaces to network protocol layers, such as an IP layer 344 and supporting transport mechanisms, namely, a TCP layer 343 and a User Datagram Protocol (UDP) layer 348. A file system protocol layer provides multi-protocol file access and, to that end, includes support for a DAFS protocol 341, an NFS protocol 347, a CIFS protocol 349, and a Hypertext Transfer Protocol (HTTP) 350. A virtual interface (VI) layer 342 implements the VI architecture to provide direct access transport (DAT) capabilities, such as RDMA, as required by DAFS protocol 341. An iSCSI driver layer 355 provides block protocol access over the TCP/IP network protocol layers, while an FC driver layer 356 receives and transmits data access requests to and responses from a respective node. The FC and iSCSI drivers provide FC-specific and iSCSI-specific access control to the data and manage exports of logical units (luns) to the iSCSI or FC components. Incoming data access requests are converted into file system commands that are embedded within cluster fabric (CF) protocol messages by CF interface modules 346a-346b, which cooperate to provide a single file system image across all disk modules of the cluster storage server system 102.

In addition, the storage operating system 238 includes a series of software layers organized to form a storage device server 365 that provides data paths for accessing information stored on the disks 112.1-112.2 and on the disk shelf 122. The storage device server 365 includes a file system module 361 for managing volumes 359, a RAID system module 362, and a disk driver system module 363. The RAID system 362 manages the storage and retrieval of information to and from the volumes/disks in accordance with I/O operations, while the disk driver system 363 implements a disk access protocol such as, e.g., the SCSI protocol. It is noted that an aggregate, i.e., a collection of volumes, can be divided into a number of virtual volumes, which can be manipulated (read from or written to) through one or more virtual storage servers hosted by the hardware of the storage server node 208.

The file system 361 implements a virtualization system of the storage operating system 238 through interaction with one or more virtualization modules illustratively embodied as, e.g., a virtual disk (vdisk) module 366 and a SCSI target module 354. The vdisk module 366 enables access by administrative interfaces, such as a user interface of a management framework, in response to a user (system administrator) issuing commands to one of the nodes 108.1-108.3. The SCSI target module 354 is disposed between the FC and iSCSI drivers 355, 356 and the file system 361 to provide a translation layer of the virtualization system between the block (lun) space and the file system space, where luns are represented as blocks.

The file system 361 is illustratively a message-based system that provides logical volume management capabilities for use in access to the information stored on the disks 112.1-112.2 and on the disk shelf 122. That is, in addition to providing file system semantics, the file system 361 provides functions normally associated with a volume manager. These functions include aggregation of the disks, aggregation of storage bandwidth of the disks, and reliability guarantees, such as mirroring and/or parity. The file system 361 illustratively implements the WAFL file system having an on-disk format representation that is block-based, and using index nodes (Modes) to identify files and file attributes (such as creation time, access permissions, size, and block location). It is understood, however, that the file system 361 may implement any other suitable file system. The file system 361 uses files to store metadata such as that describing the layout of its file system. These metadata files include, among others, an Mode file. A file handle, i.e., an identifier that includes an Mode number, is used to retrieve an Mode from a disk.

Operationally, a request from one of the client systems 104.1-104.2 is forwarded as a packet over the computer network 106 to one of the nodes 108.1-108.3 where it is received at the network data adapter 232. A network driver (of the layer 345 or the layer 356) processes the packet and, as appropriate, passes it on to a network protocol and file access layer for additional processing prior to forwarding to the file system 361. Here, the file system 361 generates operations to load (retrieve) the requested data from one of the disks 112.1, 112.2 or from the disk shelf 122 if it is not cached in the memory 237. If the information is not in the memory 237, then the file system 361 indexes into the Mode file using the Mode number to access an appropriate entry and retrieve a logical volume block number (VBN). The file system 361 then passes a message structure including the logical VBN to the RAID system 362. The logical VBN is mapped to a disk identifier and disk block number (DBM), and sent to an appropriate driver (e.g., SCSI) of the disk driver system 363, which accesses the DBN from the specified disk and loads the requested data block(s) in memory for processing by the respective node. Upon completion of the processing of the client request, the respective node typically returns a response to the client system over the network 106.

C. Virtualized Storage Operating System

Figure 5:
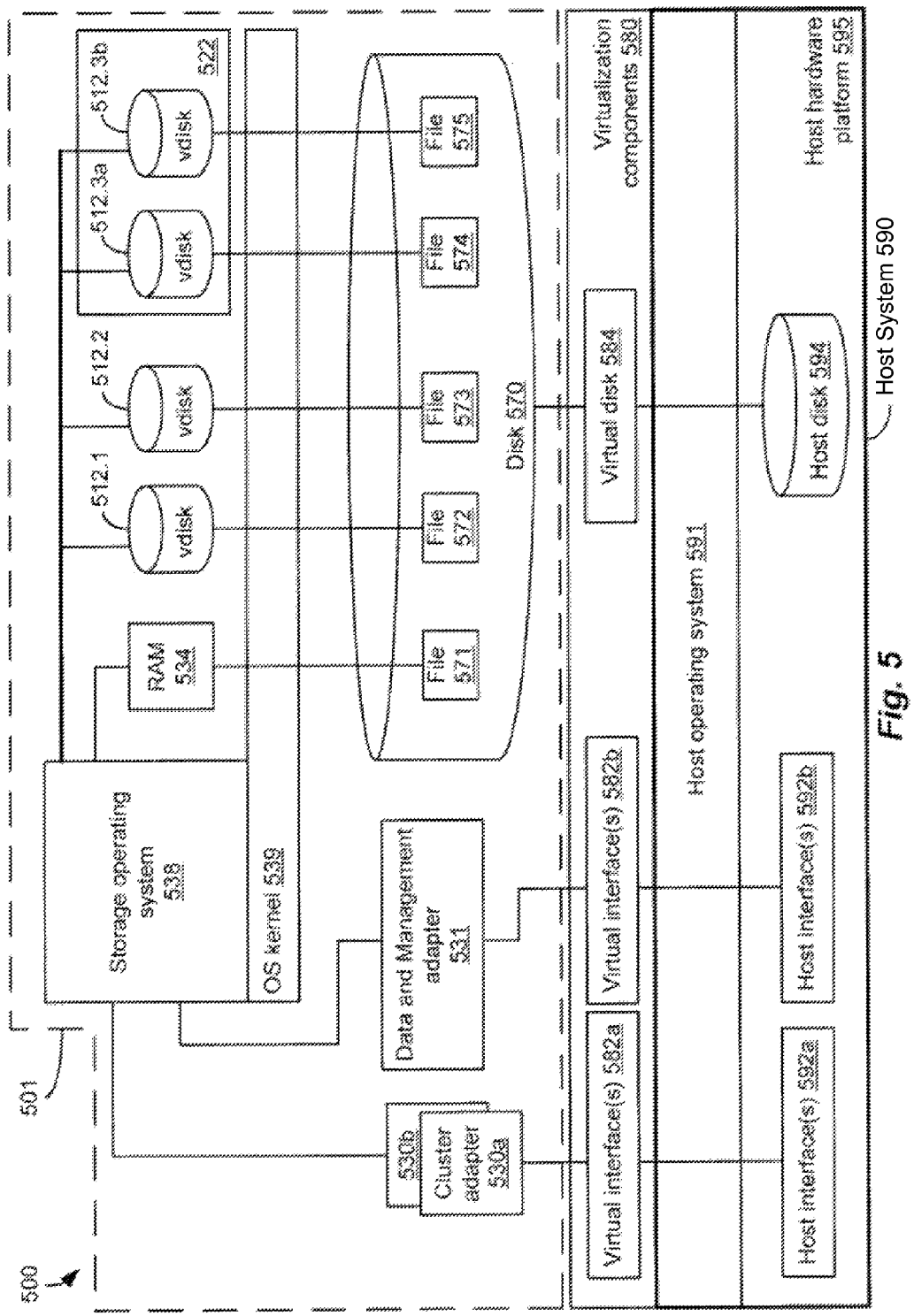
FIG. 5 is a block diagram of the storage operating system of FIG. 3 modified to execute as a virtualized operating system of a virtual machine.

In some embodiments, a virtual storage server environment 500 may be used that implements a virtualized storage operating system 501 (see FIG. 5). The presently disclosed virtualized storage operating system 501 will be better understood following the discussion below relating to how the storage operating system 238/239 can be modified to allow a representation of the cluster storage server system 102 to be implemented on a computer hardware platform that does not include the non-volatile memory (NVRAM) 234, the disks 112.1-112.2, or the disk shelf 122 of the clustered system 102.

Figure 4:
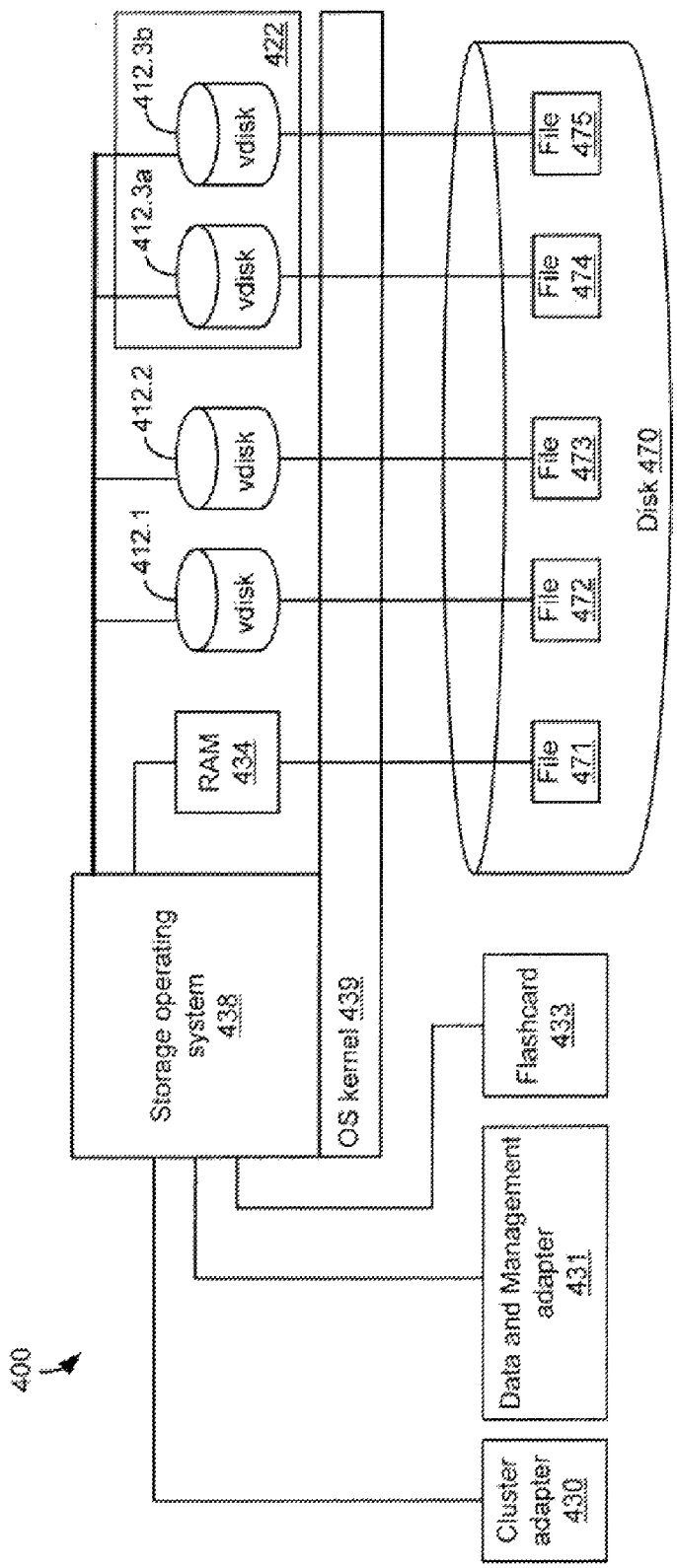
FIG. 4 is a block diagram of the storage operating system of FIG. 3 modified to execute on a conventional computer hardware platform.

FIG. 4 depicts an illustrative embodiment of a storage operating system 438/439 modified to execute in a computer environment 400 comprising a computer hardware platform that does not include a non-volatile memory (NVRAM) and disks for storing volume data. In the illustrated embodiment, the computer environment 400 includes the storage operating system 438 such as the NetApp® Data ONTAP™ storage operating system, the operating system kernel 439 such as the FreeBSD operating system kernel, a cluster adapter 430, a network data and management adapter 431, and a flashcard 433. As discussed above, the computer environment 400 does not include the non-volatile memory (NVRAM) 234 (see FIG. 2), nor does it include the disks 112.1-112.2 or the disk shelf 122 (see FIG. 2) for storing volume data.

Accordingly, the computer environment 400 includes a simulated NVRAM. In this context, the simulation of the NVRAM means that the operation of the NVRAM is represented by a Random Access Memory (RAM) 434 backed-up by a data file 471 contained in a standard mass storage device such as a disk 470. The simulated NVRAM is accessible via the operating system kernel 439. In addition, the computer environment 400 includes a plurality of simulated disks and a simulated disk shelf. Each of the simulated disks is implemented by a virtual disk (vdisk) backed-up by a data file contained in the disk 470 and accessible via the operating system kernel 439. Specifically, a first simulated disk is implemented by a vdisk 412.1 backed-up by a data file 472, and a second simulated disk is implemented by a vdisk 412.2 backed-up by a data file 473. Similarly, third and fourth simulated disks of a simulated disk shelf 422 are implemented by vdisks 412.3a, 412.3b backed-up by data files 474a, 474b, respectively. By configuring the storage operating system 438/439 to operate in conjunction with the simulated NVRAM 434/471 and the simulated disks 412.1/472, 412.2/473, 412.3a/474, 412.3b/475 in the computer environment 400, the storage operating system 438/439 can be configured to execute on computer hardware platforms that do not include non-volatile memories and disks for storing volume data.

It is noted that the cluster adapter 430, the data and management adapter 431, the flashcard 433, the RAM 434, and the vdisks 412.1-412.2, 412.3a-412.3b are illustrated in FIG. 4 as being directly connected to the storage operating system 438 for clarity of illustration. It will be apparent to those of ordinary skill in the art that, in a practical implementation, the operating systems 438/439, the RAM 434, and the vdisks 412.1-412.2, 412.3a-412.3b can be implemented in one or more suitable memories communicably interconnected with the cluster adapter 430, the data and management adapter 431, the flashcard 433, and the disk 470 via one or more suitable buses. It will be further appreciated that, in a practical implementation, the computer environment 400 can include one or more processors operative to execute the storage operating systems 438/439 and software applications out of at least one memory. The storage operating system 438/439 in the computer environment 400 can be further modified to execute as a virtualized (guest) operating system of a virtual machine (VM).

FIG. 5 depicts an illustrative embodiment of the virtual storage server environment 500, including the virtualized storage operating system 501 executing as a guest operating system of a virtual machine, in accordance with some embodiments. The virtual storage server environment 500 allows an entire storage operating system to be simulated by executing the storage operating system 501 as a guest operating system of a virtual machine operating on a host system. In some embodiments, a client system may be used as a host system that executes a host operating system and a plurality of virtual machines (VMs). Each virtual machine may comprise a guest operating system that is a virtualized storage operating system. The virtualized storage operating system may provide a simulated storage server to client systems for accessing data on the storage devices, the simulated storage server appearing as an actual storage server to the client systems. As such, a virtual machine that implements a virtualized storage operating system may be referred to as a "virtual storage server." As such, a plurality of instantiations of the virtualized storage operating system 501 (virtual storage servers) can be executed as a plurality of guest operating systems of a plurality of virtual machines operating simultaneously on the same host system, thereby allowing multiple instantiations of virtual storage servers to co-exist on the same host system.

Alternatively, multiple instantiations of the virtualized storage operating system 501 can be executed as multiple guest operating systems of virtual machines operating simultaneously on multiple host systems interconnected by one or more computer networks, thereby forming a virtual storage server environment. In such a virtual storage server environment, each virtual machine operating on a respective host system can represent a storage server node of an actual cluster storage server system. By executing each virtualized storage operating system 501 as a guest operating system of a virtual machine operating on a respective host system, a virtual cluster storage server system can be created having functionality that is practically indistinguishable from an actual cluster storage server system. In addition, facilities of the storage operating system, including high cost components such as the mass storage devices and non-volatile RAM, can be mapped onto one or more lower cost peripherals associated with the host hardware platform via the virtual facilities of a virtual machine.

As shown in FIG. 5, the virtual storage server environment 500 comprises the virtualized storage operating system 501 including a storage operating system 538, an operating system kernel 539, one or more emulated cluster adapters 530a-530b, and at least one emulated network data and management adapter 531. Like the computer environment 400, the virtual storage server environment 500 includes a simulated NVRAM implemented by a RAM 534 backed-up by a data file 571 contained in standard mass storage such as a disk 570, a first simulated disk implemented by a vdisk 512.1 backed-up by a data file 572 contained in the disk 570, a second simulated disk implemented by a vdisk 512.2 backed-up by a data file 573 contained in the disk 570, a third simulated disk implemented by a vdisk 512.3a backed-up by a data file 574a contained in the disk 570, and a fourth simulated disk implemented by a vdisk 512.3b backed-up by a data file 574b contained in the disk 570. Accordingly, the virtualized storage operating system 501 is configured to provide the functionality of a storage server node, including its associated disk(s) for storing volume data, within a cluster storage server system.

In addition, the virtual storage server environment 500 includes virtualization components 580, an underlying computer (host) software operating system 591, and an underlying host system hardware platform 595 comprising hardware components/resources. As shown in FIG. 5, the virtualization components 580 include virtual interfaces (VIFs) 582a-582b and a virtual disk 584, and the underlying host hardware platform 595 includes host network interfaces 592a-592b and a local storage device such as a host disk 594. For example, the virtualization components 580 may be implemented using virtualization software (e.g., VMware™ ESX, Microsoft™ Hyper-V, Citrix XenServer™, etc.), or any other suitable virtualization software. Further, the host software operating system 591 may be the OS/X operating system available from Apple, Inc., Cupertino, Calif., USA, the Windows operating system available from Microsoft Corporation, Redmond, Wash., USA, the open source Linux operating system, or any other suitable software operating system. The virtual interfaces 582a-582b are configured to interface the emulated cluster adapters 530a-530b and the emulated network data and management adapter 531 to the respective network interfaces 592a-592b of the host hardware platform 595.

Accordingly, the host operating system 591 can be executed on the host system hardware platform 595, while one or more instantiations of the virtualized storage operating system 501 are executed as one or more guest operating systems running on the host operating system 591. Further, the virtualization components 580 include virtual interfaces such as the virtual interfaces 582a-582b and the virtual disk 584, which provide a virtual storage server environment in which the virtualized storage operating system(s) 501 can be run. In this configuration, the facilities of the virtualized storage operating system 501 (including the simulated disks, the simulated NVRAM, the emulated cluster adapters 530a-530b, and the emulated data and management adapter 531) can be mapped onto corresponding facilities of the host operating system 591 via the virtualization components 580. For example, each simulated disk implemented by a vdisk backed-up by a data file can be mapped onto the host disk 594 via the virtual disk 584. Similarly, the simulated NVRAM implemented by the RAM 534 backed-up by the data file 571 can be mapped onto the host disk 594 via the virtual disk 584. In this way, the simulated disks and simulated NVRAM, which are typically implemented by high cost components, can be mapped onto one or more lower cost peripherals associated with the host hardware platform 595, such as the host disk 594. In addition, the emulated cluster adapters 530a-530b and the emulated data and management adapter 531 can be mapped, via the virtual interfaces 582a, 582b, respectively, onto the host interfaces 592a, 592b of the host hardware platform 595.

It is noted that the emulated cluster adapters 530a-530b, the emulated data and management adapter 531, the RAM 534, and the vdisks 512.1-512.2, 512.3a-512.3b are illustrated in FIG. 5 as being directly connected to the storage operating system 538 for clarity of illustration. It will be apparent to those of ordinary skill in the art that, in a practical implementation, the operating systems 538/539, the RAM 534, and the vdisks 512.1-512.2, 512.3a-512.3b can be implemented in one or more suitable memories communicably interconnected with the emulated cluster adapter 530, the emulated data and management adapter 531, and the disk 570 via one or more suitable buses. It will be further appreciated that, in a practical implementation, the host hardware platform 595 includes at least one processor operative to execute the storage operating systems 538/539, the host operating system 591, and other software applications out of at least one memory for use in executing a virtualized storage operating system in a virtual storage server environment, as described herein.

Figure 6:
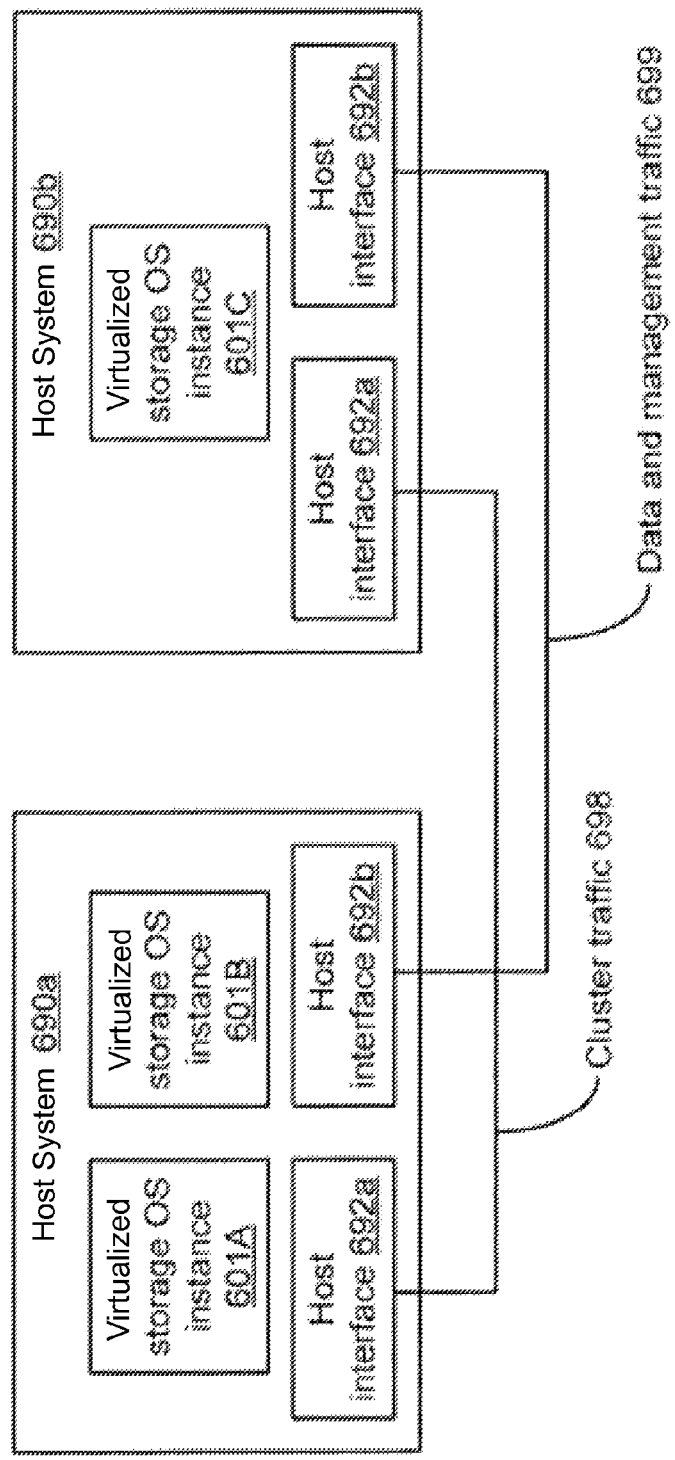
FIG. 6 is a block diagram of multiple instantiations of the storage operating system of FIG. 5.

As discussed above, multiple instantiations of the virtualized storage operating system 501 can be executed as multiple guest operating systems running simultaneously on the same host system hardware. FIG. 6 depicts two such instantiations of the virtualized storage operating system 501, namely, a virtualized storage OS instance 601A and a virtualized storage OS instance 601B, which are operative to run simultaneously on a host system platform 690a. As further discussed above, multiple instantiations of the virtualized storage operating system 501 can be executed as multiple guest operating systems running simultaneously on different host system hardware platforms. FIG. 6 depicts a third virtualized storage OS instance 601C, which is operative to run simultaneously with the instances 601A, 601B on a host system platform 690b different from the host system platform 690a.

It should be appreciated that each of the virtualized storage OS instances 601A, 601B, 601C is configured to provide the functionality of a storage server node of a cluster storage server system, including its associated disk(s) for storing volume data. To provide the functionality of a simulated cluster storage server system including three nodes corresponding to the respective instances 601A, 601B, 601C, two network interconnects 698, 699 are provided between host interfaces 692a, 692b of the respective host systems 690a, 690b. Specifically, the network interconnect 698 is configured to carry cluster traffic for each instance 601A, 601B, 601C provided over a cluster adapter (e.g., one of the emulated cluster adapters 530a-530b) and an associated virtual interface (e.g., the virtual interface 582a). Further, the network interconnect 699 is configured to carry data and management traffic for each instance 601A, 601B, 601C provided over a data and management adapter (e.g., the emulated data and management adapter 531) and an associated virtual interface (e.g., the virtual interface 582b). It is noted that, with regard to the instances 601A, 601B running on the same host system platform 690a, cluster traffic can be wrapped back to the respective cluster adapters for the instances 601A, 601B through the associated virtual interfaces. Accordingly, by executing the three virtualized storage OS instances 601A, 601B, 601C as guest operating systems running simultaneously on the host system platforms 690a, 690b, it is possible to test, during development, the operation of a simulated cluster storage server system having three nodes, each with its own virtualized storage operating system. It should be appreciated that any suitable number of virtualized storage OS instances may be executed as a corresponding number of guest operating systems running on any suitable number of host system platforms to test the operation of a simulated storage server system and its associated storage operating system.

III. First Stage for Detecting an Idle Virtual Storage Server

A. Host System

As discussed above, in a virtual storage server environment, a client system may be used as a host system that executes a plurality of virtual machines (VMs), each VM executing a virtualized storage operating system. A virtual storage server environment may comprise one or more such host systems.

Figure 7:
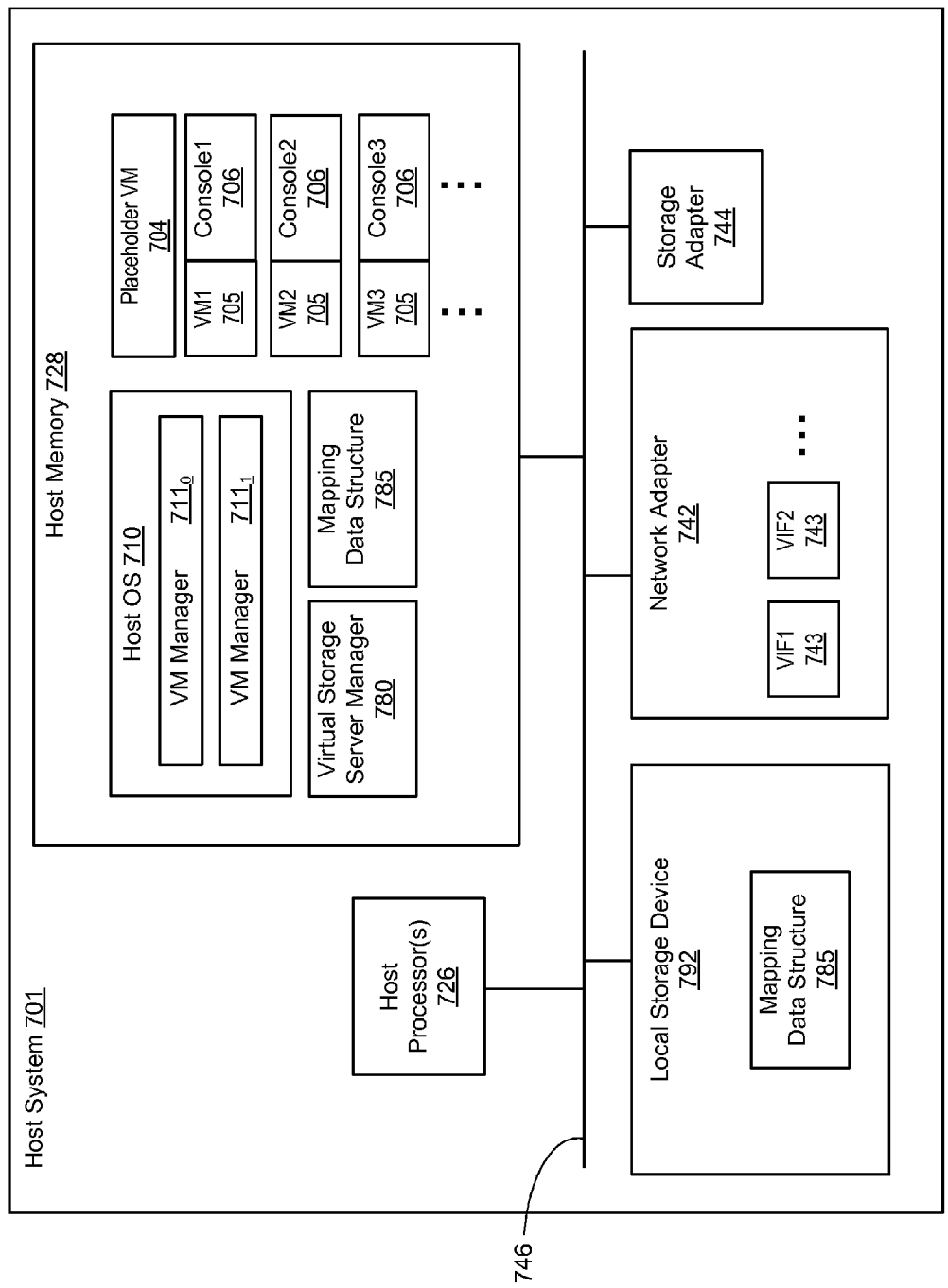
FIG. 7 is a diagram illustrating components of a host system within a virtual storage server environment.

FIG. 7 is a diagram illustrating components of a host system 701 within a virtual storage server environment. The host system 701 may comprise computer hardware components configured for performing the embodiments described herein. As shown in FIG. 7, a host system 701 may comprise one or more host processor(s) 726, host memory 728, one or more network adapters 742, one or more storage adapters 744, local storage device 792, and other devices or peripherals (not shown) coupled to the processor by a bus 746.

The host processors are the central processing units (CPUs) of the host system 701 and, thus, control the overall operation of the host system 701. Processors may include one or more programmable general-purpose or special-purpose microprocessors, digital signal processors (DSPs), programmable controllers, application specific integrated circuits (ASICs), programmable logic devices (PLDs), or the like, or a combination of such devices.

A network adapter 742 may comprise mechanical, electrical, and signaling circuitry needed to connect the host system 701 to the network and to receive and transmit data over the network. The network adapter 742 may comprise a network port controller (e.g., Ethernet cards), specialized network adapters, or any other physical device that controls the receiving and transmitting of data over a network. A network adapter 742 may comprise a plurality of network ports 743 (data-access ports) for coupling the host system 701 to one or more other client systems through a network. A connection with a client system may be established using a network port of the network adapter 742 to receive and transmit data though the network. In some embodiments, the network ports 743 are implemented as virtual interfaces (e.g., VIF1, VIF2, etc.). Each network port/VIF 743 may have an associated unique identifier (e.g., an Internet Protocol (IP) address endpoint) that is received and used by the client system to establish the network connection. A VIF may transparently change association from one network port 743 to another network port 743 (within the same host system 701 or another host system 701). In some embodiments, the network activity of a virtual storage server may be examined to determine if the virtual storage server has received any network activity from client systems for a predetermined period of time. This may be done, for example, by monitoring the network ports/VIFs 743 and IP addresses of the virtual storage server for a predetermined period of time.

Local storage device 792 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). As shown in the example of FIG. 7, local storage device 792 may store a mapping data structure 785.

Host memory 728 comprises storage locations that are addressable by the processor and adapters, as well as other devices for storing software program code such as the software described herein. The host processor and adapters may, in turn, comprise processing elements and/or logic circuitry configured to execute the software code. Host memory 728 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein.

Host memory 728 is for storing software program instructions and data structures such as a host operating system 710, at least one placeholder VM 704, a plurality of virtual machines (VM1, VM2, VM3, etc.) 705, a plurality of console server modules (Console1, Console2, Console3, etc.) 706, a virtual storage server manager module 780, and a mapping data structure 785. A host system 701 loads instructions and data into host memory 728 from which they are accessed and executed or processed by host processors 726 via a bus 746.

The host operating system 710 may be, for example, UNIX®, Windows®, Linux®, or any other operating system. The host operating system 710 may comprise one or more different types of VM manager modules $711_0$, $711_1$, etc. (e.g., VMware™ ESX, Microsoft™ Hyper-V, etc.). The different types of VM manager modules 711 may produce different types of VMs 705.

A VM manager module 711 executes on the host system to produce, configure, and manage the VMs 705. The VM manager module/engine may also virtualize and allocate hardware and/or software resources of the host system 701 for use by the VMs 711. As such, the host system 701 may comprise a pool of hardware and/or software resources that are shared by the plurality of VMs 711, each VM 711 being allocated a set of resources for exclusive use by the VM manager module/engine 711. For example, the VM manager module 711 may allocate to each VM 711 one or more processors 726, a particular amount of storage space in the host memory 728 and/or the local storage device 792, one or more network ports/VIFs 743 (each with a unique IP address) for use by the VM 711. Each VM may have an associated set of network ports/VIFs 743 and IP addresses used by client systems to connect to the VM. As discussed below in relation to FIG. 8, the VM manager module 711 may also allocate to each VM 711 resources that also include virtual storage components and underlying storage objects distributed on one or more storage servers. As such, the maximum number of VMs that can be hosted on the host system is limited by the amount of hardware and/or software resources of the host system.

Each VM 705 may comprise a separate encapsulation or instance of a separate operating system that executes on the host system 701. Each VM 705 may execute a guest operating system on the host system 701, the guest operating system comprising a virtualized storage operating system. The virtualized storage operating system may provide storage services to one or more client systems connected with the VM 705. A VM 705 executing a virtualized storage operating system may be referred to as a virtual storage server. As such, each host system 701 may execute and support a plurality of virtual storage servers, each virtual storage server being allocated a set of hardware and/or software resources of the host system 701.

The host memory 728 may also comprise a console server module/engine 706 for each VM 705. The console server module 706 may provide a virtual console for the VM for use by an administrator/user to input data and/or commands to the VM. The console server module 706 may communicate with the VM 705 on one end, and be connected and communicate with a console system on the other end (the console system being connected with a client system connected with the VM 705). The console system is discussed further below in relation to FIG. 8.

In some embodiments, a virtual storage server manager module/engine 780 may reside and execute on the host system 701 for performing embodiments described herein. The virtual storage server manager module 780 may be configured to do so automatically, without human initiation, interaction, or intervention. For example, the virtual storage server manager module 780 may be configured to 1) detect/identify idle virtual storage servers, 2) suspend a virtual storage server identified as idle, and 3) resume/un-suspend a suspended virtual storage server.

B. Virtual Storage Server Environment

Figure 8:
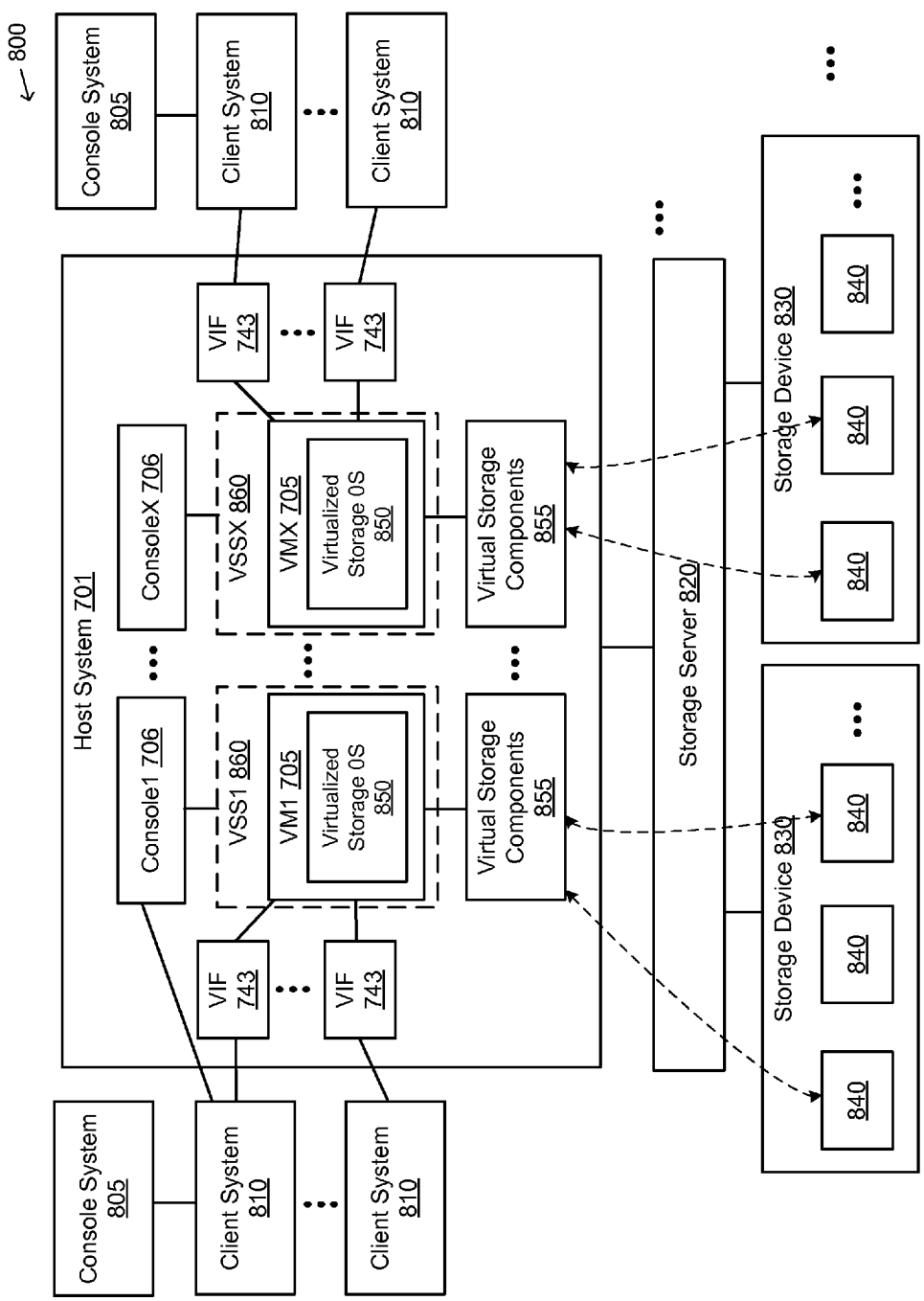
FIG. 8 is a diagram illustrating components of a virtual storage server environment using the host system of FIG. 7.

FIG. 8 is a diagram illustrating components of a virtual storage server environment 800 using the host system 701 of FIG. 7. As shown in FIG. 8, the virtual storage server environment 800 may comprise one or more host systems 701, one or more client systems 810, one or more console systems 805, and one or more storage servers 820 which are interconnected through a network (e.g., LAN, WAN, Internet, etc.).

The host system 701 executes a plurality of VMs 705, each VM 705 executing a virtualized storage operating system 850 (comprising a virtual storage server), which is referred to herein as a virtual storage server (VSS) 860. Each virtual storage server 860 may provide storage services to one or more client systems. In other embodiments, a virtual storage server may provide a virtual simulator used by engineers for testing and developing software products. The host system 701 may execute and host a plurality of virtual storage servers 860, each virtual storage server having a unique identifier (e.g., VSS1, VSS2, etc.) within the host system 701. The virtual storage server (VSS) identifiers may be assigned, for example, by a VM manager module 711 or the virtual storage server manager module 780. Each VM 705 may be connected with one or more client systems 810 that use the virtualized storage operating system 850 for accessing data stored on one or more storage servers 820. The VM 705 is allocated a plurality of VIFs 743, each VIF connecting a client system 810 with the VM through a network (e.g., using an IP address associated with the VIF 743).

The host system 705 may execute a console server module 706 for each VM 705. The console server module 706 may provide a virtual console for the VM for use by an administrator/user to input data or commands to the corresponding VM. The console server module 706 may communicate with the VM 705 on one end, and communicate with a console system 805 on the other end. As shown in FIG. 8, the console system 805 may be connected with a client system 810 that is connected with a VM 705 and its corresponding console server module 706 through a network connection (e.g., TCP/IP connection). The console system 805 may receive data and/or commands (inbound data) from a user, the console system 805 may send the inbound data to the client system 810, which in turn sends the inbound data to the console server module 706. In response, the console server module 706 may send output data (outbound data) to the client system 810, which in turn sends the outbound data to the console system 805 for display.

Each console system 805 may comprise input devices (e.g., keyboard and mouse) used by an administrator/user to input data and/or commands to the VM 705 and console server module 706. Each console system 805 may further comprise output devices (e.g. monitor) to display responses from the VM 705 and console server module 706. As used herein, data and/or commands from a console system 805 that is received by a console server module 706 (via the client system 810) for a virtual storage server 860 comprises "inbound data." As used herein, output data produced in response to the inbound data that is sent from the console server module 706 to the console system 805 (via the client system 810) comprises "outbound data."

A client system 810 may access a virtual storage server 860 for accessing data stored on one or more storage servers 820. Each storage server 820 may comprise one or more storage devices 830 for storing one or more storage objects 840 (e.g., volumes logical units (LUs), q trees, etc.) for storing data of a client system 810. As discussed above, the VM manager module 711 of a host system 701 may virtualize the hardware and/or software resources for use by the VMs 705 of the host system 701. For each host system 701, these resources may include storage objects 840 distributed on the one or more storage servers 820. Each storage server 820 may allocate its storage objects 840 to one or more host systems 701. As such, each host system 701 may have one or more storage objects 840 available for allocation to the VMs 705 by the VM manager module 711.

The storage objects 840 allocated to a VM may be virtualized by the VM manager 711 for use by the VM. The VM manager module 711 may do so by specifying and producing virtual storage components 855 for the storage objects 840 allocated to the VM. For example, a virtual storage component may comprise a virtual hard disk (VHD), a datastore, or a virtual machine disk (VMDK) allocated to a VM. To a VM 705, each virtual storage component 855 may appear as a directly attached physical storage device (e.g., a drive or disk) that is directly accessed by the VM. But in fact, each virtual storage component 855 hosted on a host system 701 is supported by an underlying corresponding storage object 840 residing on a storage server 820 (as indicated by the dashed lines in FIG. 8). As used herein, an "underlying" storage object corresponding to a virtual storage component comprises the storage object on the storage server that stores the actual data for the virtual storage component.

As described above, each virtual storage server 860 on the host system 701 may be allocated one or more storage objects 840 (e.g., volumes) on one or more storage servers 820 for storing data of one or more client systems 810. Before a client system 810 can use a storage object 840, however, the client system 810 requests a mount procedure for the storage object 840 by sending a mount request/command to the virtual storage server through the network (e.g., using the Network File System (NFS), CIFS, or ISCSI protocols). The mount procedure makes the storage object 840 accessible to the client system. A mounted storage object 840 may then appear to the client system 810 as a direct-attached physical storage device, such as a direct-attached Small Computer System Interface (SCSI) or Serial ATA (SATA) disk device.

After the storage object 840 is mounted, the client system 810 may access the storage object 840 (e.g., for storing or reading data). To do so, the client system 810 may send, through the network, access requests (e.g., read or write requests) to the virtual storage server 860 for processing by the virtual storage server 860 on the storage object 840. As used herein, a client system may send storage object-related requests through the network to the virtual storage server for processing on a storage object, the storage object-related requests including mount requests and access requests (e.g., read and write requests). In some embodiments, the network activity of the virtual storage server may be examined to determine if the virtual storage server has received any storage object-related requests from client systems for a predetermined period of time. In some embodiments, network activity of a virtual storage server may be examined to determine, for example, whether any storage objects of the virtual storage server have been mounted or accessed within a predetermined time period.

C. Detecting Idle Virtual Storage Servers on a Host System

A problem occurs if a virtual storage server 860 is allocated resources of the host system 701 but the virtual storage server 860 is not in use (is idle). In this situation, valuable resources of the host system 701 are being wasted by the unused/idle virtual storage server 860 and there may not be enough resources to provision new virtual storage servers 860 on the host system. Conventional methods of detecting idle virtual machines may include monitoring processor usage and storage device input/output (I/O) operations. However, the virtual storage server may implement a "heartbeat" feature that periodically executes a message signal procedure that requires processor usage and I/O operations. In some cases, a virtual storage server may be idle except for the periodic execution of the heartbeat feature. In these cases, the virtual storage server should still be considered idle as the virtual storage server is otherwise not in use.

Figure 9:
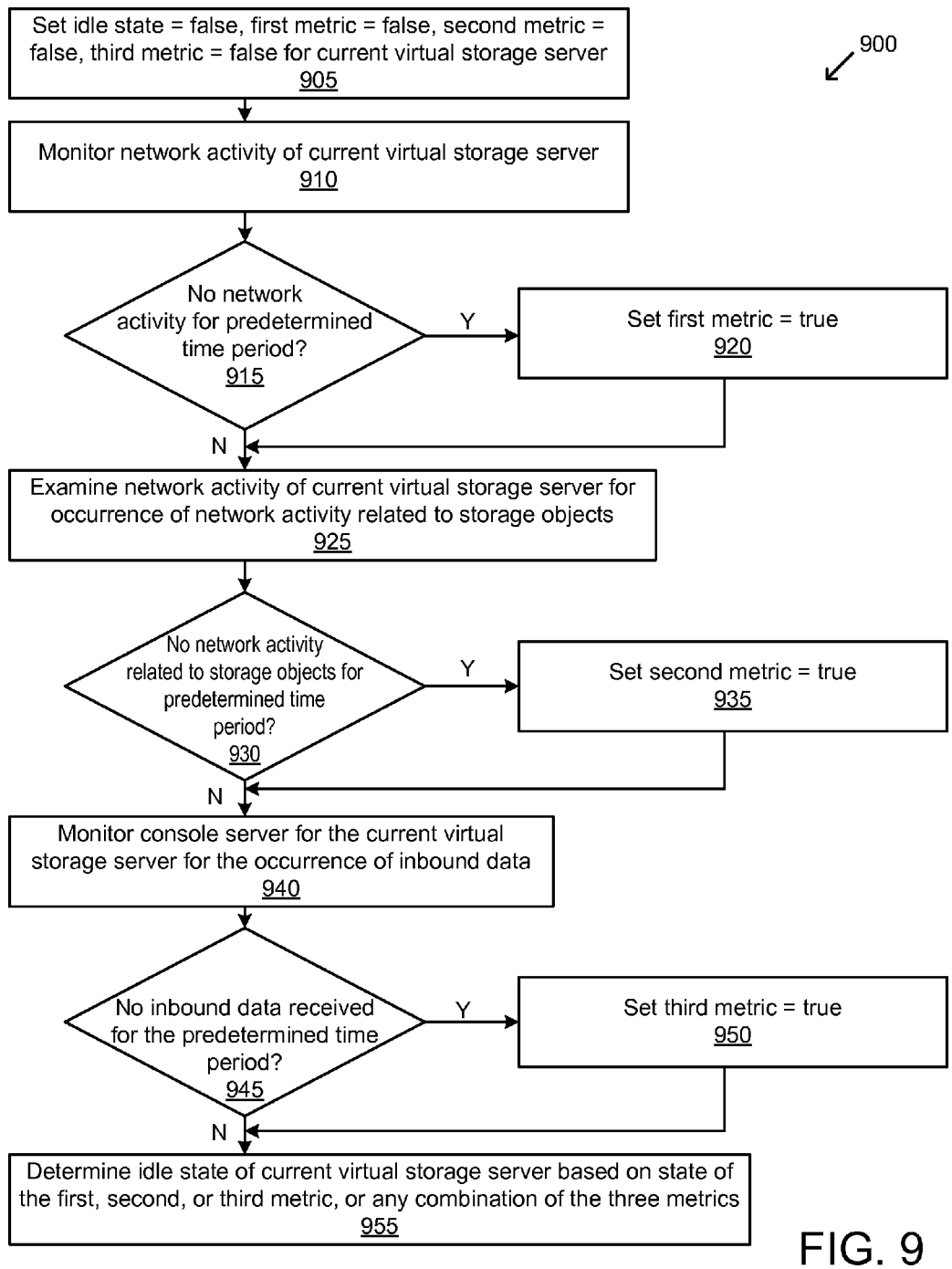
FIG. 9 is a flowchart of a method for detecting/identifying idle virtual storage servers on a host system.

FIG. 9 is a flowchart of a method 900 for detecting/identifying idle virtual storage servers 860 on a host system 701 that executes a plurality of virtual storage servers 860. The method 900 of FIG. 900 is described in relation to FIG. 10 which conceptually illustrate steps of the method 900. In some embodiments, the method 900 may be performed automatically, without human initiation, interaction, or intervention. The order and number of steps of the method 900 are for illustrative purposes only and, in other embodiments, a different order and/or number of steps are used. In some embodiments, some of the steps of the method 900 are performed or caused to be performed by the virtual storage server manager module 780. The virtual storage server manager module 780 may work in conjunction with other modules and components of the host system 701 (such as the host operating system 710, VM manager module(s) 711, network adapter(s) 742, etc.) to perform the method 900. The method 900 may be repeatedly performed on each virtual storage server 860 of the host system 701, in series or in parallel, to identify any idle virtual storage servers of the host system 701.

The method 900 begins by setting (at 905) an idle state of a current virtual storage server 860 (currently being examined) to false (indicating that the state of the current virtual storage server 860 is not idle). The method also sets (at 905) states for first, second, and third metrics for the current virtual storage server 860 to false (indicating that conditions for the first, second, and third metrics are not found for the current virtual storage server 860). In some embodiments, the first metric comprises the occurrence of network activity of the virtual storage server 860 within a predetermined time period, the second metric comprises the occurrence of network activity of the virtual storage server 860 that is related to storage objects of the virtual storage server within a predetermined time period, and the third metric comprises the occurrence of inbound data for the virtual storage server 860 within a predetermined time period. In some embodiments, the predetermined time periods for the three metrics may be equal. In other embodiments, the predetermined time periods for the three metrics may differ.

Figure 10:
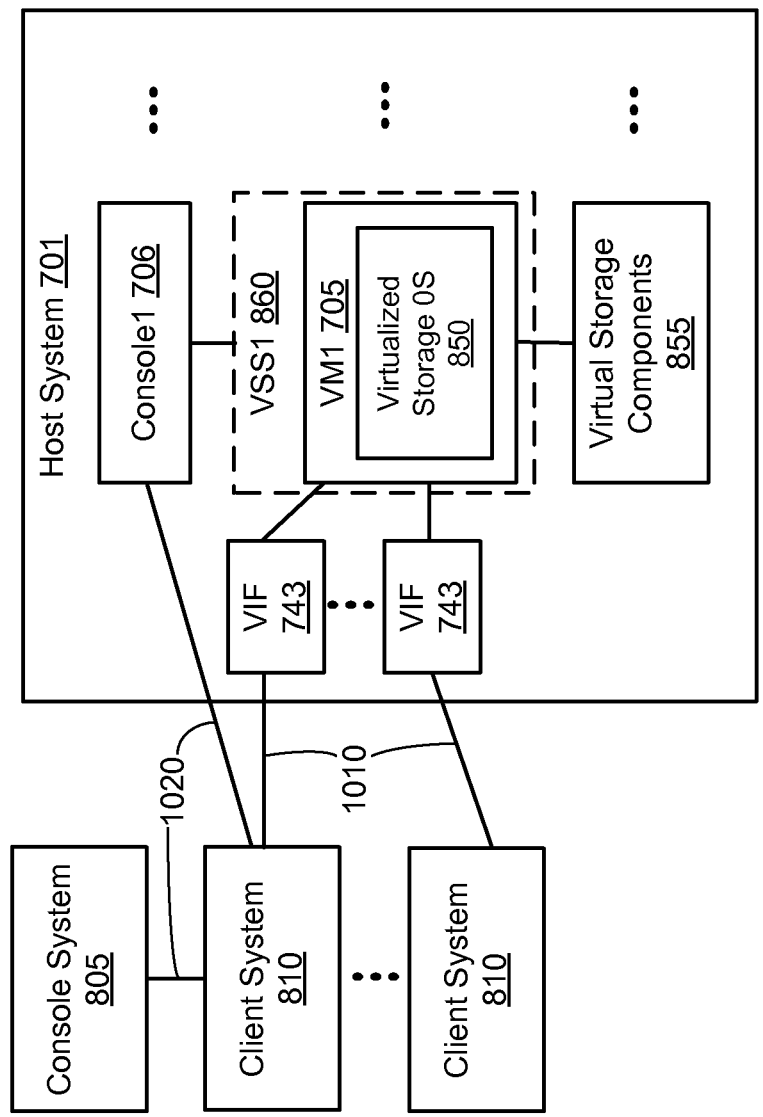
FIG. 10 conceptually illustrates steps of the method of FIG. 9.

For the first metric, the method 900 monitors (at 910) the network activity of the current virtual storage server for a predetermined time period. As shown in FIG. 10, network activity of network connections 1010 with client systems 810 connected with the virtual storage server may be monitored. The method 900 may do so using various techniques. For example, the method 900 may monitor the network activity of the network ports/VIFs 743 of the current virtual storage server, monitor whether any network connections (e.g., Telnet or Secure Shell (SSH) connections) by any client systems have been established on any of the network ports/VIFs 743 of the current virtual storage server, and/or monitor whether any network connections by any client systems have been established on any of the IP addresses of the virtual storage server. For example, the method 900 may use functions of the VM manager module 711 that allow monitoring of the network activity of the network ports/VIFs 743 of the current virtual storage server.

The method 900 then determines (at 915) if no network activity has occurred for the current virtual storage server for the predetermined period of time. The method 900 may do so, for example, by determining if no network activity has occurred on the network ports/VIFs 743, determining if no network connections have been established on any of the network ports/VIFs 743, and/or determining if no network connections have been established on any of the IP addresses of the virtual storage server for the predetermined period of time. If the method 900 determines that network activity has occurred during the predetermined period of time (915—No), the method 900 continues at step 925. If the method 900 determines that no network activity has occurred for the predetermined period of time (915—Yes), the method 900 then sets (at 920) the state of the first metric to true for the current virtual storage server. The method then continues at step 925.

For the second metric, the method 900 examines (at 925) the network activity of the virtual storage server 860 for the occurrence of network activity related to storage objects of the virtual storage server for a predetermined time period. As shown in FIG. 10, network activity of network connections 1010 with client systems 810 connected with the virtual storage server may be examined for the occurrence of storage object-related requests. The network activity of a virtual storage server 860 may be examined to determine, for example, whether the virtual storage server 860 has received any mounting requests or access requests (e.g., read or write requests) through the network connections 1010 for any storage objects of the virtual storage server 860. The method 900 may use functions of the VM manager module 711 that allow monitoring of the network activity of the network ports/VIFs 743 of the current virtual storage server.

The method 900 then determines (at 930) if no network activity related to storage objects has occurred for the current virtual storage server for the predetermined period of time. The method 900 may do so, for example, by determining if no storage object-related requests (e.g., mount or access requests) have been received by the virtual storage server for the predetermined period of time. If the method 900 determines that network activity related to storage objects has occurred during the predetermined period of time (930—No), the method 900 continues at step 940. If the method 900 determines that no network activity related to storage objects has occurred for the predetermined period of time (930—Yes), the method 900 then sets (at 935) the state of the second metric to true for the current virtual storage server. The method then continues at step 940.

For the third metric, the method 900 monitors (at 940) the console server 706 for the current virtual storage server for the occurrence of inbound data for the current virtual storage server from a console system 805 for a predetermined time period. As shown in FIG. 10, inbound data 1020 for the current virtual storage server may be sent from a console system 805 and received at a client system 810, which sends the inbound data 1020 to the console server 706. The data activity between the console/client system and the current virtual storage server may be monitored to determine whether the virtual storage server has received any inbound data 1020 from the console/client system.

The method 900 then determines (at 945) if no inbound data for the current virtual storage server has been received by the console server 706 for the predetermined period of time. If the method 900 determines that inbound data has been received during the predetermined period of time (945—No), the method 900 continues at step 955. If the method 900 determines that inbound data has not been received for the predetermined period of time (945—Yes), the method 900 then sets (at 950) the state of the third metric to true for the current virtual storage server. The method then continues at step 955.

The method 900 then determines (at 955) the idle state of the current virtual storage server based on the state of the first metric, second metric, or third metric, or any combination of the states of the three metrics. In some embodiments, any of the first, second, or third metrics may be used alone to determine the idle state of the current virtual storage server. In other embodiments, any combination of the three metrics may be used to determine the idle state of the current virtual storage server. In some embodiments, a different set of one or more metrics may be used for different virtual storage servers 860 of the host system 701. For example, a first set of one or more metrics may be used for a first virtual storage server 860 and a second set of one or more metrics may be used for a second virtual storage server 860.

The following are examples of different combinations of the metrics that may be used: 1) the idle state of the current virtual storage server is set to true if the state of the first metric is true, 2) the idle state of the current virtual storage server is set to true if the state of the second metric is true, 3) the idle state of the current virtual storage server is set to true if the state of the third metric is true, 4) the idle state of the current virtual storage server is set to true if the states of the first and second metrics are true, 5) the idle state of the current virtual storage server is set to true if the states of the first and third metrics are true, 6) the idle state of the current virtual storage server is set to true if the states of the second and third metrics are true, or 7) the idle state of the current virtual storage server is set to true if the states of the first, second, and third metrics are true.

If the idle state of the current virtual storage server 860 is set to true, the current virtual storage server 860 has been identified as idle. The method 900 may be repeatedly performed on each virtual storage server 860 of the host system 701, in series or in parallel, to identify any idle virtual storage servers of the host system 701.

IV. Second Stage for Suspending an Idle Virtual Storage Server

Each virtual storage server 860 on the host system 701 identified as idle in the first stage may be suspended in a second stage. In some embodiments, an idle virtual storage server is suspended while still preserving the state of the idle virtual storage server for possible later use (in stage 3). Note that each idle virtual storage server has a unique identifier (e.g., VSS1, VSS2, etc.) within the host system 701.

Figure 11:
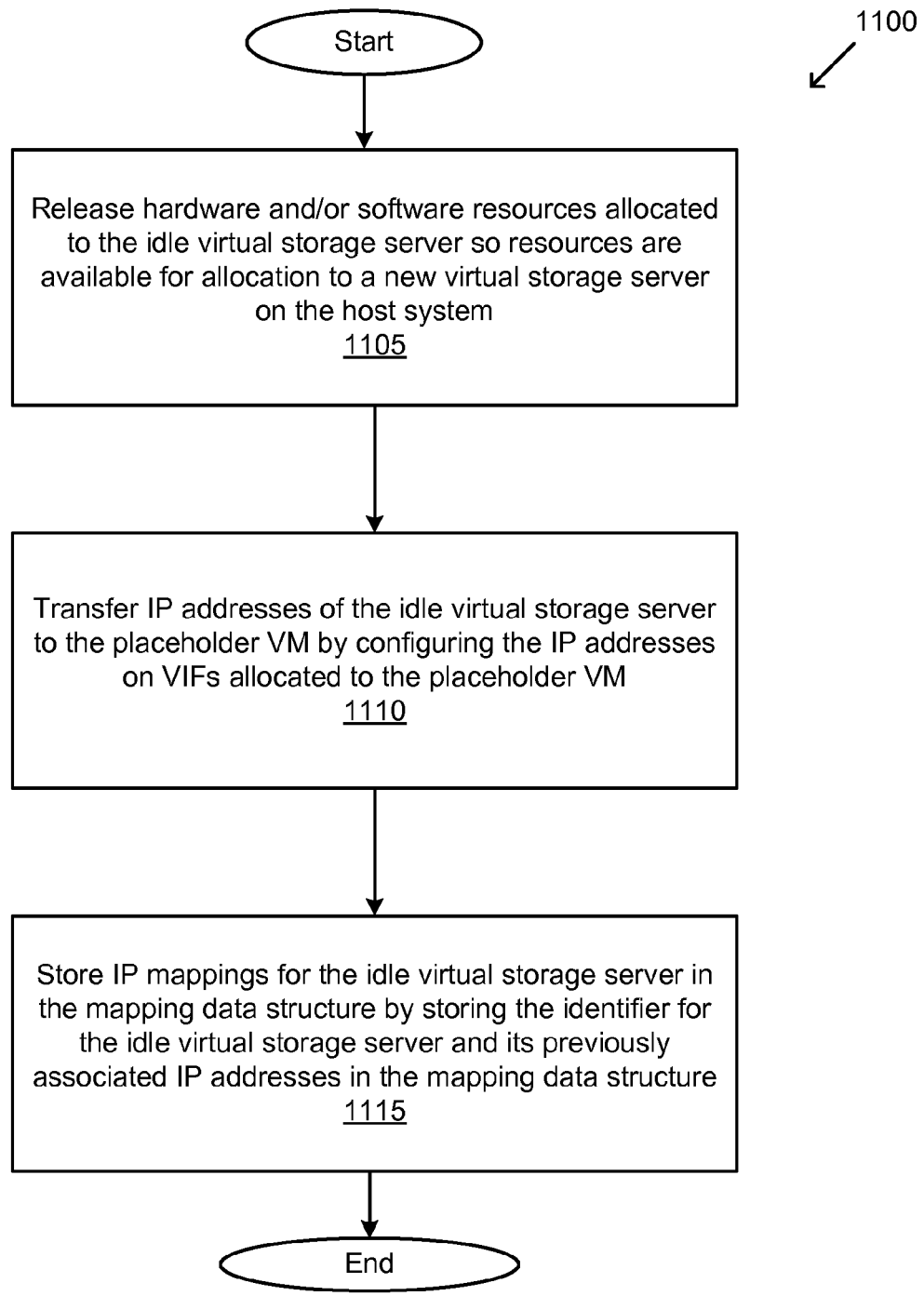
FIG. 11 is a flowchart of a method for suspending idle virtual storage servers on a host system.

FIG. 11 is a flowchart of a method 1100 for suspending idle virtual storage servers 860 on a host system 701. The method 1100 of FIG. 1100 is described in relation to FIGS. 12 and 13 which conceptually illustrate steps of the method 1100. In some embodiments, the method 1100 may be performed automatically, without human initiation, interaction, or intervention. The order and number of steps of the method 1100 are for illustrative purposes only and, in other embodiments, a different order and/or number of steps are used. In some embodiments, some of the steps of the method 1100 are performed or caused to be performed by the virtual storage server manager module 780. The virtual storage server manager module 780 may work in conjunction with other modules and components of the host system 701 (such as the host operating system 710, VM manager module(s) 711, network adapter(s) 742, etc.) to perform the method 1100. The method 1100 may be performed on each virtual storage server 860 of the host system 701 identified as idle.

The method 1100 begins by releasing (at 1105) the hardware and/or software resources allocated to the idle virtual storage server 860 by the VM manager module 711. The method 1100 may do so by allowing the resources of the idle virtual storage server 860 to be available for allocation to a new virtual storage server 860 by the VM manager module 711.

Figure 12:
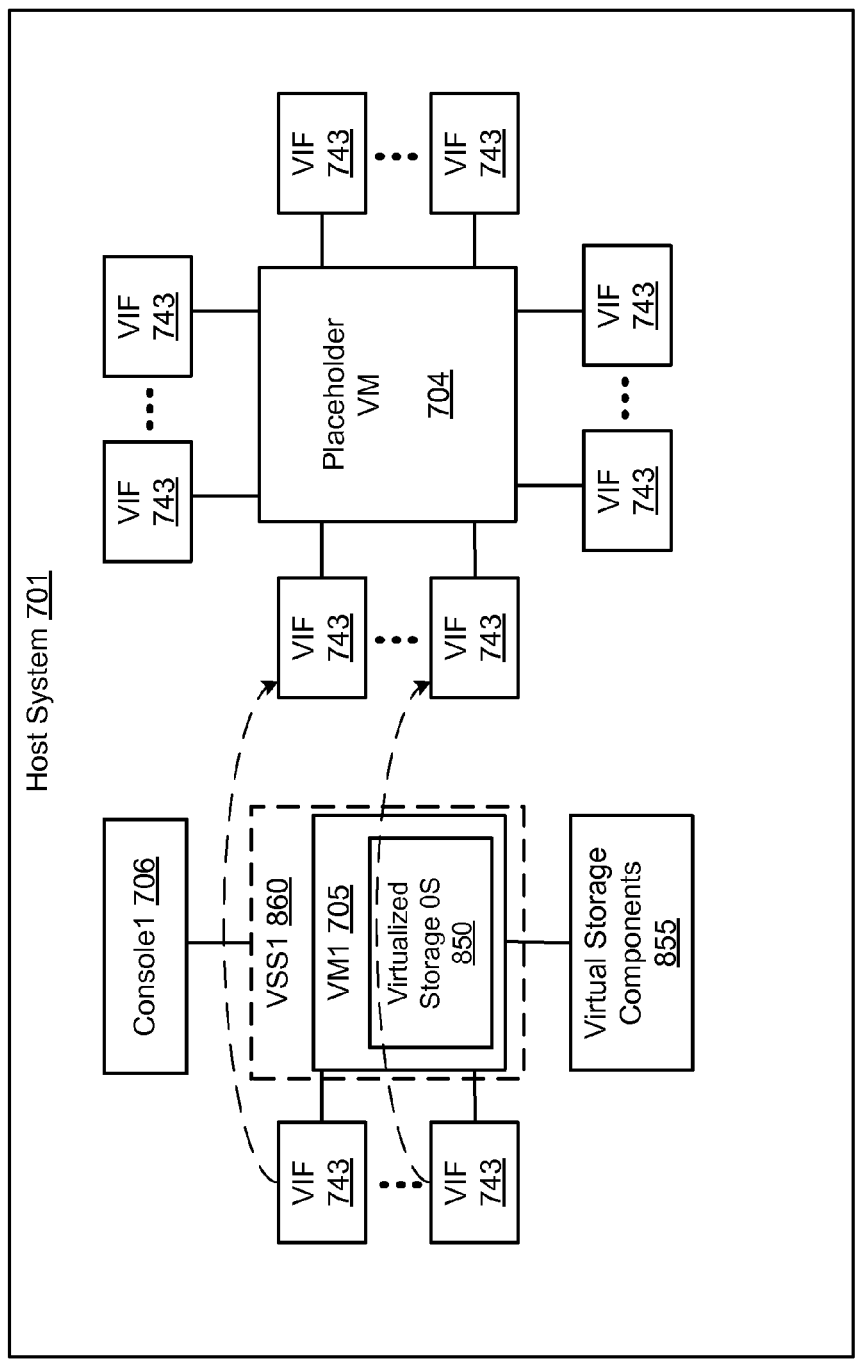
FIG. 12 conceptually illustrates steps of the method of FIG. 11.

The method 1100 then transfers (at 1110) the IP addresses of the VIFs 743 allocated to the idle virtual storage server to the placeholder VM 704 on the host system 701 (shown conceptually in FIG. 12). The method 1100 may do so by communicating the IP addresses of the idle virtual storage server to the placeholder VM 704 and configuring the IP addresses on VIFs 743 allocated to the placeholder VM 704. In these embodiments, each host system 701 is configured to execute a placeholder VM 704 that is allocated a total number of network ports/VIFs 743 that allow for receiving and configuring the IP addresses of all the virtual storage servers on the host system. The total number of network ports/VIFs 743 may be determined, for example, by determining the maximum number of virtual storage servers that are able to execute simultaneously on the host system multiplied by the maximum number of virtual interfaces/ports that will be allocated to each virtual storage server. In some embodiments, the placeholder VM 704 is allocated a minimal amount of hardware and/or software resources (e.g., processor or memory resources) by the VM manager module 711. In these embodiments, the placeholder VM 704 is allocated less resources than VMs 705 executing virtualized storage operating systems 850 by the VM manager module 711.

Figure 13:
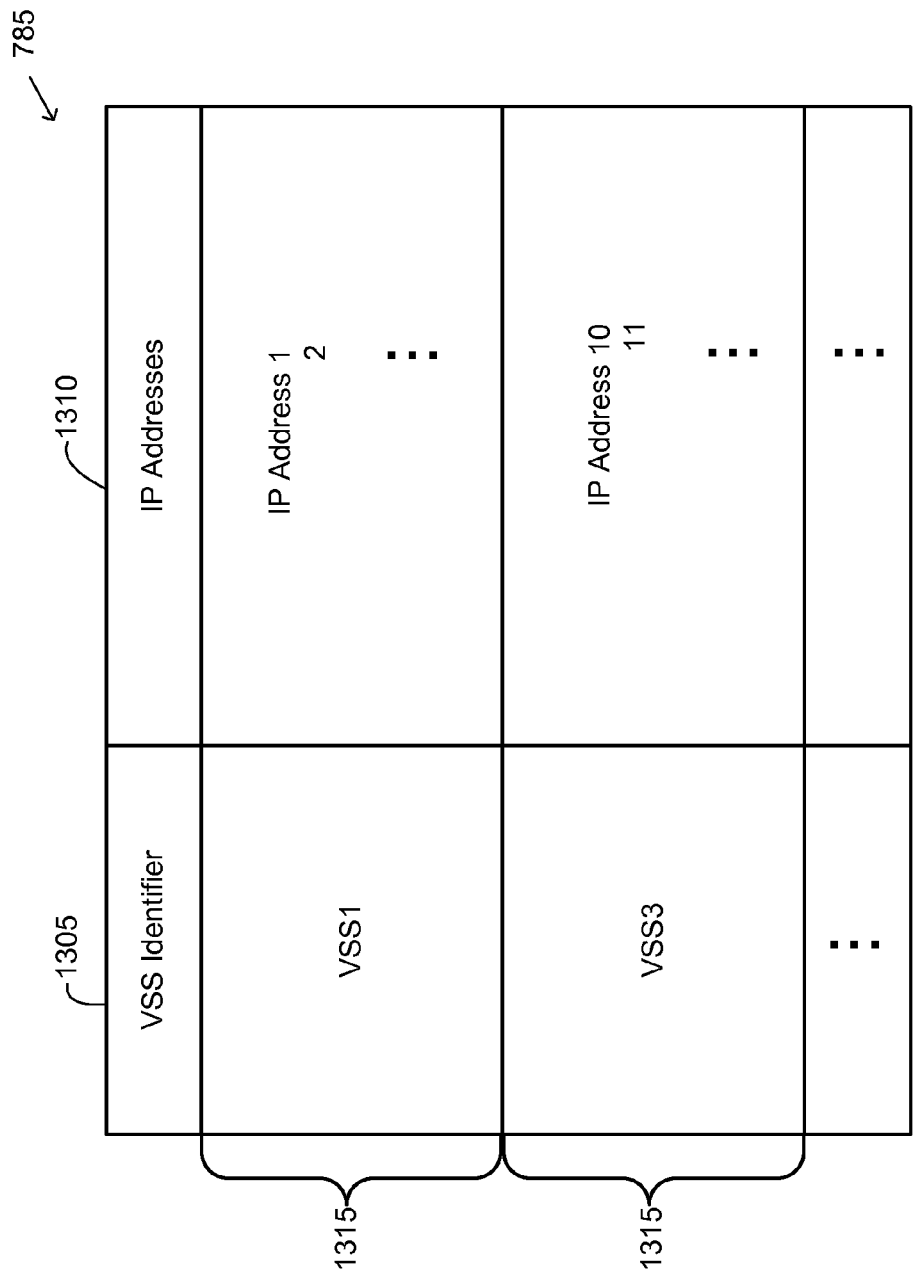
FIG. 13 shows an exemplary mapping data structure used in some embodiments.

The method 1100 then stores (at 1115) IP mappings for the idle virtual storage server in the mapping data structure 785. The method 1100 may do so by storing the identifier for the idle virtual storage server and its previously associated IP addresses in the mapping data structure 785. FIG. 13 shows an exemplary mapping data structure 785 used in some embodiments. The mapping data structure 785 comprises a plurality of mapping entries 1315, each entry 1315 representing IP mappings for one idle virtual storage server. Each entry 1315 may comprise a plurality of data fields for storing data describing the IP mappings, including data fields for a virtual storage server (VSS) identifier 1305 (for storing the identifier of the idle virtual storage server) and IP addresses 1310 (for storing the previous IP addresses of the idle virtual storage server).

The method 1100 may be performed on each virtual storage server 860 of the host system 701 identified as idle. After the method 1100 is performed on an idle virtual storage server 860, it may be referred to as a suspended virtual storage server 860.

V. Third Stage for Un-Suspending a Suspended Virtual Storage Server

An idle virtual storage server 860 suspended in the second stage may be un-suspended in a third stage in certain conditions. In some embodiments, if a client system 810 attempts to access a suspended virtual storage server or a console server module 706 of the suspended virtual storage server, a process is performed to un-suspend/resume the virtual storage server.

Figure 14:
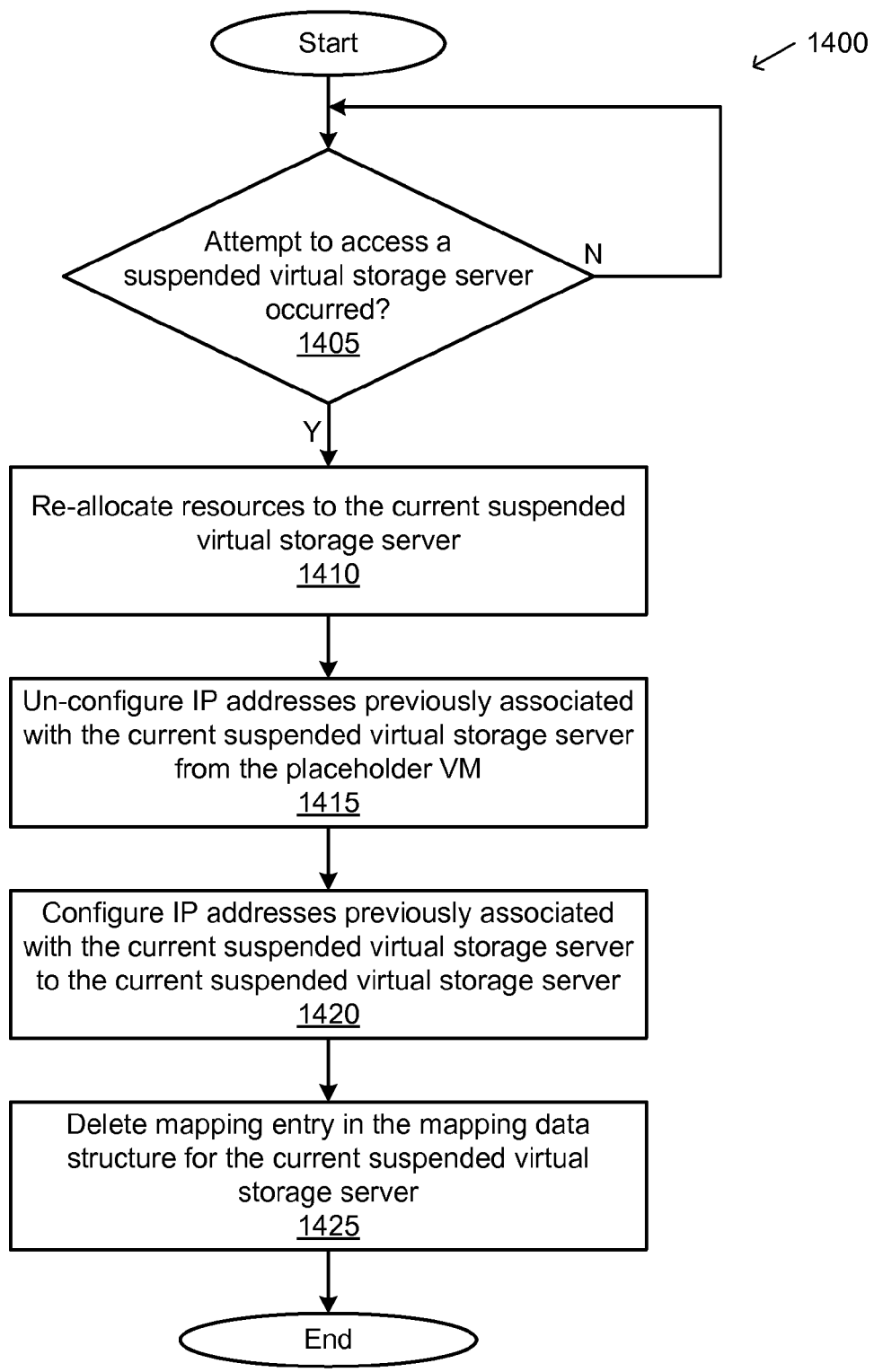
FIG. 14 is a flowchart of a method for un-suspending/resuming a suspended virtual storage server.
Figure 15:
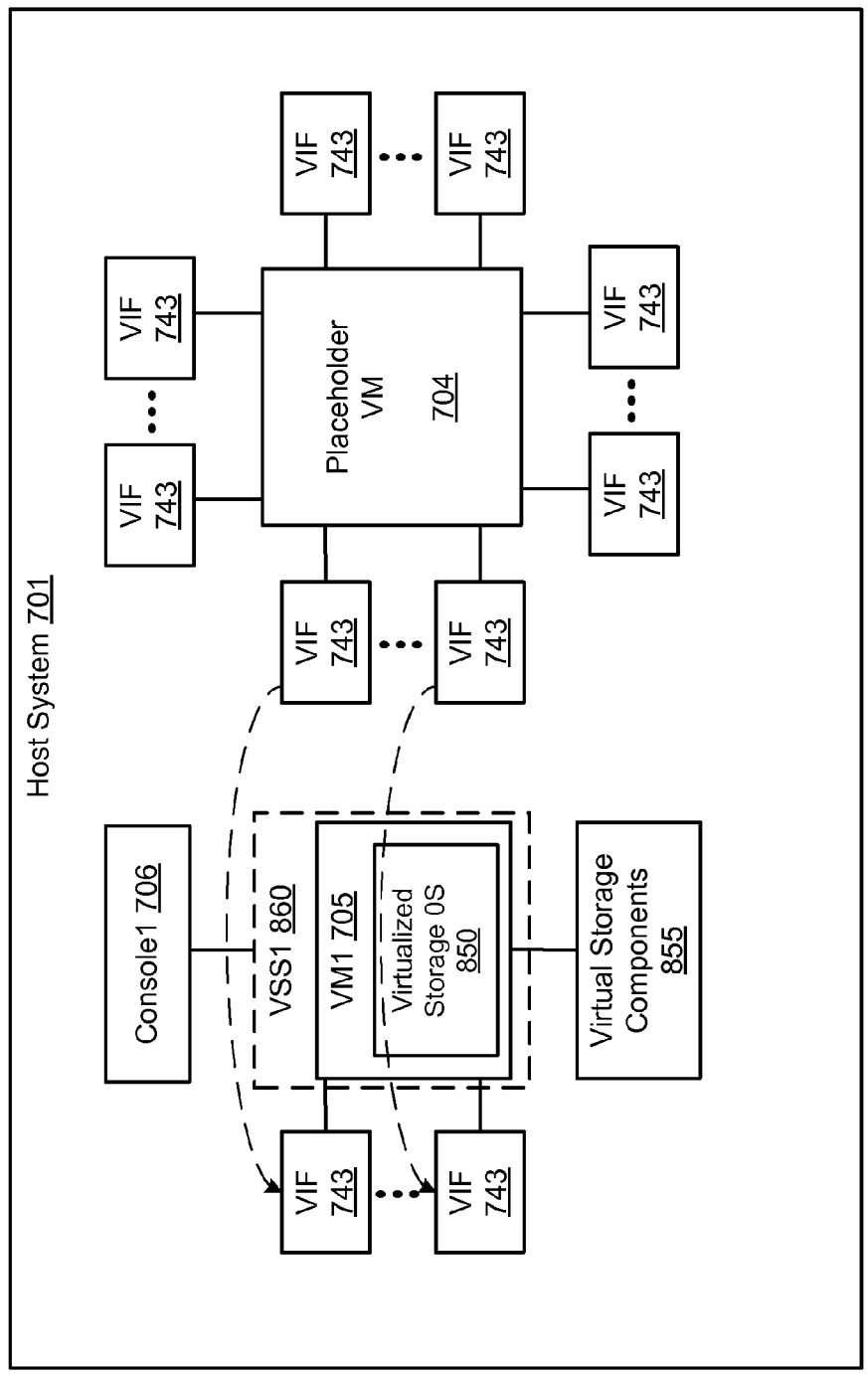
FIG. 15 conceptually illustrates steps of the method of FIG. 14.

FIG. 14 is a flowchart of a method 1400 for un-suspending/resuming a suspended virtual storage server 860. The method 1400 of FIG. 1400 is described in relation to FIG. 15 which conceptually illustrates steps of the method 1400. In some embodiments, the method 1400 may be performed automatically, without human initiation, interaction, or intervention. The order and number of steps of the method 1400 are for illustrative purposes only and, in other embodiments, a different order and/or number of steps are used. In some embodiments, some of the steps of the method 1400 are performed or caused to be performed by the virtual storage server manager module 780. The virtual storage server manager module 780 may work in conjunction with other modules and components of the host system 701 (such as the host operating system 710, VM manager module(s) 711, network adapter(s) 742, etc.) to perform the method 1400. The method 1400 may be performed on each suspended virtual storage server 860 of the host system 701 that is attempted to be accessed.

The method 1400 begins by determining (at 1405) if an attempt to access a suspended virtual storage server has occurred. In some embodiments, the method 1400 may determine if network activity with a suspended virtual storage server is attempted by a client system using an IP address previously associated with a suspended virtual storage server (referred to as a "previous IP addresses"). The method 1400 may do so using the mapping data structure 785 which stores IP address previously associated with suspended virtual storage servers.

Any network data from a client system that is sent to a previous IP address of a suspended virtual storage server will be received by the placeholder VM 704, since each previous IP address of each suspended virtual storage server has been configured on a VIF 743 of the placeholder VM 704 in the second stage. As such, the method 1400 may determine (at 1405) that an attempt to access a suspended virtual storage server has occurred if it determines that the placeholder VM 704 has received network data having the previous IP address of the suspended virtual storage server. For example, the received network data may comprise a network connection request or storage object-related request for the suspended virtual storage server. The method 1400 may also determine (at 1405) that an attempt to access a suspended virtual storage server has occurred if an attempt to access a console server module 706 of a suspended virtual storage server has occurred by determining that the console server module 706 has received inbound data for the suspended virtual storage server.

If the method 1400 determines (at 1405—Yes) that an attempt to access a suspended virtual storage server has occurred (the suspended virtual storage server being referred to as the current suspended virtual storage server), the method continues at step 1410. The current suspended virtual storage server may then be un-suspended/resumed in steps 1410 through 1425. If the method does not (at 1405—No), the method 1400 returns to step 1405 and continues to monitor for access attempts.

The method 1400 may then re-allocate (at 1410) hardware and/or software resources of the host system 701 to the current suspended virtual storage server. For example, the method 1400 may communicate a request to the VM manager module 711 to re-allocate resources to the current suspended virtual storage server, and the VM manager modules 711 will allocate the resources, if available, otherwise the current suspended virtual storage server may be migrated to another host system in the cluster with sufficient resources and can be resumed on the other host system.

The method 1400 then un-configures/removes (at 1415) all IP addresses previously associated with the current suspended virtual storage server from the VIFs 743 of the placeholder VM 704. For example, the method 1400 may communicate a request to the VM manager module 711 to un-configure/remove these IP addresses from the placeholder VM 704. The method 1400 may do so using the mapping data structure 785 which stores IP address previously associated with suspended virtual storage servers.

The method 1400 then configures (at 1420) all IP addresses previously associated with the current suspended virtual storage server to the VIFs 743 of the current suspended virtual storage server. For example, the method 1400 may communicate a request to the VM manager module 711 to configure these IP addresses on the current suspended virtual storage server. The method 1400 may do so using the mapping data structure 785 which stores IP address previously associated with suspended virtual storage servers. The transferring of IP addresses from the placeholder VM 704 back to the current suspended virtual storage server is shown conceptually in FIG. 15.

The method 1400 then deletes (at 1425) the mapping entry 1315 in the mapping data structure 785 for the current suspended virtual storage server. After the method 1400 is performed on the current suspended virtual storage server, it may be referred to as an un-suspended/resumed virtual storage server. The method 1400 then returns to step 1405 and continues to monitor for access attempts.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system for detecting idle virtual storage servers, the system comprising:
    a host system configured for:
    executing a plurality of virtual storage servers, each virtual storage server comprising a virtual machine implementing a storage operating system for providing data storage services to one or more network connected client systems;
    allocating hardware resources of the host system to each virtual storage server;
    detecting that a virtual storage server is idle by:
    monitoring network activity of the virtual storage server;
    determining that no network activity has occurred on the virtual storage server for a predetermined time period; and
    identifying the virtual storage server as an idle virtual storage server each virtual storage server is allocated one or more virtual interfaces, each virtual interface having an associated Internet Protocol (IP) address; and
    suspending an identified idle virtual storage server by:
    releasing the hardware resources of the host system allocated to the identified idle virtual storage server for availability to another virtual storage server; and
    transferring the IP addresses associated with the identified idle virtual storage server to virtual interfaces of a placeholder virtual machine configured on the host system.

2. The system of claim 1, wherein:
    each virtual storage server is allocated one or more virtual interfaces for establishing one or more network connections with one or more client systems; and
    monitoring network activity of the virtual storage server comprises monitoring network activity on the one or more virtual interfaces of the virtual storage server.

3. The system of claim 1, wherein:
    each virtual storage server is allocated one or more storage objects for storing data;
    monitoring network activity of the virtual storage server comprises monitoring network activity relating to storage objects of the virtual storage server; and
    determining that no network activity has occurred on the virtual storage server within the predetermined time period comprises determining that no network activity relating to storage objects of the virtual storage server has occurred within the predetermined time period.

4. The system of claim 3, wherein:
    network activity relating to storage objects of the virtual storage server comprises a mount request for a storage object or an access request for a storage object of the virtual storage server.

5. The system of claim 1, wherein:
    a mapping data structure is stored on the host system for storing a unique identifier for each suspended virtual storage server and IP addresses previously associated with each suspended virtual storage server.

6. The system of claim 1, wherein:
    the host system is further configured for un-suspending a suspended virtual storage server by:
    determining that a client system attempted to access the suspended virtual storage server;
    allocating resources of the host system to the suspended virtual storage server; and
    transferring the IP addresses previously associated with the suspended virtual storage server from the virtual interfaces of the placeholder virtual machine to virtual interfaces of the suspended virtual storage server.

7. An article of manufacture comprising a non-transitory computer readable storage medium having comprising instructions that, when executed, cause a system to:
    execute a plurality of virtual storage servers, each virtual storage server comprising a virtual machine implementing a storage operating system for providing data storage services to one or more network connected client systems;
    allocate hardware resources of the host system to each virtual storage server;
    detect that a virtual storage server is idle, wherein the instructions to detect, when executed, further cause the system:
    monitor network activity of the virtual storage server;
    determine that no network activity has occurred on the virtual storage server for a predetermined time period; and
    identify the virtual storage server as an idle virtual storage server each virtual storage server is allocated one or more virtual interfaces,
    each virtual interface having an associated Internet Protocol (IP) address; and
    suspend an identified idle virtual storage server, wherein the instructions to suspend, when executed, further cause the system to:
    release the hardware resources of the host system allocated to the identified idle virtual storage server for availability to another virtual storage server; and
    transfer transferring the IP addresses associated with the identified idle virtual storage server to virtual interfaces of a placeholder virtual machine configured on the host system.

8. The non-transitory computer readable storage medium of claim 7, wherein:
    each virtual storage server is allocated one or more virtual interfaces for establishing one or more network connections with one or more client systems; and
    the instructions to monitor network activity of the virtual storage server, when executed, is to further monitor comprises monitoring network activity on the one or more virtual interfaces of the virtual storage server.

9. The non-transitory computer readable storage medium of claim 7, wherein:
    each virtual storage server is allocated one or more storage objects for storing data;
    the instructions to monitor network activity of the virtual storage server, when executed, is to further monitor network activity relating to storage objects of the virtual storage server; and
    the instructions to determine that no network activity has occurred on the virtual storage server within the predetermined time period, when executed, is to further determine that no network activity relating to storage objects of the virtual storage server has occurred within the predetermined time period.

10. The non-transitory computer readable medium of claim 9, wherein:
 network activity relating to storage objects of the virtual storage server comprises a mount request for a storage object or an access request for a storage object of the virtual storage server.

11. The non-transitory computer readable storage medium of claim 7, wherein:
 a mapping data structure is stored on the host system for storing a unique identifier for each suspended virtual storage server and IP addresses previously associated with each suspended virtual storage server.

12. The non-transitory computer readable storage medium of claim 7, further comprising instructions to un-suspend for un-suspend a suspended virtual storage server, when executed, further cause the system to:
 determine that a client system attempted to access the suspended virtual storage server;
 allocate resources of the host system to the suspended virtual storage server; and
 transfer the IP addresses previously associated with the suspended virtual storage server from the virtual interfaces of the placeholder virtual machine to virtual interfaces of the suspended virtual storage server.

13. A system, the system comprising:
 a host system configured for:
 executing a plurality of virtual storage servers, each virtual storage server comprising a virtual machine implementing a storage operating system;
 executing, for each virtual storage server, a console server for receiving inbound data for the virtual storage server from a console system;
 allocating hardware resources of the host system to each virtual storage server; detecting that a virtual storage server is idle by:
 monitoring the console server for inbound data for the virtual storage server;
 determining that no inbound data has been received for a predetermined time period; and
 identifying the virtual storage server as an idle virtual storage server, each virtual storage server is allocated one or more virtual interfaces, each virtual interface having an associated Internet Protocol (IP) address; and
 suspending an identified idle virtual storage server by:
 releasing the hardware resources of the host system allocated to the identified idle virtual storage server for availability to another virtual storage server; and
 transferring the IP addresses associated with the identified idle virtual storage server to virtual interfaces of a placeholder virtual machine configured on the host system.

14. The system of claim 13, wherein:
 the host system is further configured for un-suspending a suspended virtual storage server by:
 determining that an attempt to access the console server of the suspended virtual storage server has occurred;
 allocating resources of the host system to the suspended virtual storage server; and
 transferring the IP addresses previously associated with the suspendedvirtual storage server from the virtual interfaces of the placeholder virtual machine to virtual interfaces of the suspended virtual storage server.

15. An article of manufacture comprising a non-transitory computer readable storage medium comprising instructions that, when executed, cause a system to:
 execute a plurality of virtual storage servers, each virtual storage server comprising a virtual machine implementing a storage operating system;
 execute, for each virtual storage server, a console server for receiving inbound data for the virtual storage server from a console system;
 allocate hardware resources of the host system to each virtual storage server;
 detect that a virtual storage server is idle, wherein the instructions to detect, when executed, further cause the system to:
 monitor the console server for inbound data for the virtual storage server;
 determine that no inbound data has been received for a predetermined time period; and
 identify the virtual storage server as an idle virtual storage server, each virtual storage server is allocated one or more virtual interfaces, each virtual interface having an associated Internet Protocol (IP) address; and
 suspend an idle virtual storage server, wherein the instructions to suspend, when executed, further cause the system to:
 release the resources allocated to the idle virtual storage server for availability to another virtual storage server; and
 transfer the IP addresses associated with the identified idle virtual storage server to virtual interfaces of a placeholder virtual machine configured on the host system.

16. The non-transitory computer readable storage medium of claim 15, further comprising instructions to un-suspend a suspended virtual storage server, when executed, further cause the system to:
 determine that an attempt to access the console server of the suspended virtual storage server has occurred;
 allocate resources of the host system to the suspended virtual storage server; and
 transfer the IP addresses previously associated with the suspended virtual storage server from the virtual interfaces of the placeholder virtual machine to virtual interfaces of the suspended virtual storage server.

* * * * *

UNITED STATES PATENT AND TRADEMARK OFFICE
CERTIFICATE OF CORRECTION

PATENT NO.        : 8,880,687 B1                                    Page 1 of 1
APPLICATION NO.   : 13/366961
DATED             : November 4, 2014
INVENTOR(S)       : Chandrachari et al.

It is certified that error appears in the above-identified patent and that said Letters Patent is hereby corrected as shown below:

In the Specification

Col. 1, line 35, reading "-miming-" should be --running--
Col. 11, line 43, reading "-(Modes)-" should be --(inodes)--
Col. 11, lines 49, 50, 62 and 63, reading "-Mode-", each occurrence, should be --inode--

In the Claims

Claim 7, Col. 28, line 25, reading "-system-:", replace with --system to:--
Claim 7, Col. 28, line 41, delete "-transferring-"
Claim 12, Col. 29, line 14, delete "-un-suspend for-"
Claim 14, Col. 30, line 6, reading "-suspendedvirtual-" should be --suspended virtual--

Signed and Sealed this
Third Day of March, 2015

Michelle K. Lee
*Deputy Director of the United States Patent and Trademark Office*